(12) United States Patent
Arima et al.

(10) Patent No.: US 12,235,471 B2
(45) Date of Patent: Feb. 25, 2025

(54) OPTICAL BODY, LIGHTING DEVICE, AND IMAGE DISPLAY DEVICE

(71) Applicant: DEXERIALS CORPORATION, Tokyo (JP)

(72) Inventors: Mitsuo Arima, Tokyo (JP); Kazuki Hoshi, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 927 days.

(21) Appl. No.: 17/274,598

(22) PCT Filed: Sep. 19, 2019

(86) PCT No.: PCT/JP2019/036662
§ 371 (c)(1),
(2) Date: Mar. 9, 2021

(87) PCT Pub. No.: WO2020/059771
PCT Pub. Date: Mar. 26, 2020

(65) Prior Publication Data
US 2021/0271004 A1  Sep. 2, 2021

(30) Foreign Application Priority Data
Sep. 21, 2018  (JP) ................. 2018-177764

(51) Int. Cl.
*G02B 3/00* (2006.01)
*G02B 27/09* (2006.01)
(52) U.S. Cl.
CPC ....... *G02B 3/0056* (2013.01); *G02B 27/0961* (2013.01)

(58) Field of Classification Search
CPC .............. G02B 3/0056; G02B 27/0961; G02B 5/0236; G02B 5/0252; G02B 5/0257; G02B 5/0278
See application file for complete search history.

(56) References Cited

U.S. PATENT DOCUMENTS

2009/0153974 A1  6/2009  Sales
2016/0004124 A1*  1/2016  Benoit ................. G02F 1/1336
349/71

FOREIGN PATENT DOCUMENTS

GB  0479490 A2 *  4/1992  .......... G02B 5/0252
JP  H06-167602 A  6/1994
(Continued)

OTHER PUBLICATIONS

Nov. 17, 2022, European Search Report issued for related EP Application No. 19861936.3.
(Continued)

*Primary Examiner* — Collin X Beatty
(74) *Attorney, Agent, or Firm* — Paratus Law Group, PLLC

(57) ABSTRACT

There is provided an optical body, a lighting device, and an image display device that are novel and improved, and can increase a homogeneous light distribution property. The optical body is provided in which a composite structure of main structural bodies is deployed continuously within a plane of a base material, in which phase distributions of the main structural bodies within the plane of the base material are equivalent to amplitude distributions each obtained by subjecting a pupil function of a two-dimensional optical aperture to Fourier transform, and a peak ratio value is less than or equal to 2.5.

8 Claims, 21 Drawing Sheets

(56) References Cited

FOREIGN PATENT DOCUMENTS

| | | |
|---|---|---|
| JP | 2003-004907 A | 1/2003 |
| JP | 2004-294745 A | 10/2004 |
| JP | 2014-063151 A | 4/2014 |
| JP | 2014-167550 A | 9/2014 |
| JP | 2015-527604 A | 9/2015 |
| JP | 2018-021991 A | 2/2018 |
| JP | 2018-109670 A | 7/2018 |
| WO | WO 98/028650 A1 | 7/1998 |
| WO | WO 2015/104239 A2 | 7/2015 |

OTHER PUBLICATIONS

Dickey et al., Laser Beam Shaping Techniques, Mar. 16, 2000, pp. 1-13, retrieved from: http://www.osti.gov/scitech/biblio/752659.

Mar. 10, 2023, Chinese Office Action issued for related CN Application No. 201980060458.7.

Jul. 5, 2022, Japanese Office Action issued for related JP Application No. 2018-177764.

Apr. 27, 2022, Chinese Office Action issued for related CN Application No. 201980060458.7.

Mar. 5, 2024, Japanese Office Action issued for related JP Application No. 2023-140154.

Oct. 22, 2024, Japanese Office Action issued for related JP Application No. 2023-140154.

\* cited by examiner

OPTICAL BODY, LIGHTING DEVICE, AND IMAGE DISPLAY DEVICE

CROSS REFERENCE TO PRIOR APPLICATION

This application is a National Stage Patent Application of PCT International Patent Application No. PCT/JP2019/036662 (filed on Sep. 19, 2019) under 35 U.S.C. § 371, which claims priority to Japanese Patent Application No. 2018-177764 (filed on Sep. 21, 2018), which are all hereby incorporated by reference in their entirety.

TECHNICAL FIELD

The present invention relates to an optical body, a lighting device, and an image display device.

BACKGROUND ART

In order to change light diffusing properties, a diffuser plate that diffuses incoming light to a desirable direction is used in many cases. Such a diffuser plate has an optical body on its surface for achieving a desirable diffusion state, and one type of such an optical body has a microlens structure in which a plurality of microlenses of a size of approximately several tens of micrometers are arranged.

For example, Patent Literature 1 below discloses an optical film having a microlens array in which a plurality of microlenses are arrayed irregularly, and the top position and top interval between the microlenses formed in such a microarray satisfy predetermined conditions.

CITATION LIST

Patent Literature

Patent Literature 1: JP 2003-4907A

SUMMARY OF INVENTION

Technical Problem

A diffuser plate is strongly required to have a homogeneous light distribution property of distributing light homogeneously wherever possible. However, a diffuser plate having a sufficient homogeneous light distribution property has not been proposed in the actual situation.

The present invention was therefore made in view of the above problems, and the present invention has an object to provide an optical body, a lighting device, and an image display device that are novel and improved, and can increase a homogeneous light distribution property.

Solution to Problem

In order to achieve the above-mentioned object, according to an aspect of the present invention, there is provided an optical body in which a composite structure of main structural bodies is deployed continuously within a plane of a base material, in which phase distributions of the main structural bodies within the plane of the base material are equivalent to amplitude distributions each obtained by subjecting a pupil function of a two-dimensional optical aperture to Fourier transform, and a peak ratio value is less than or equal to 2.5.

Herein, the two-dimensional optical aperture may have a circular, rectangular, polygonal, or free shape.

In addition, the phase distributions may be expressed by a Sinc function.

In addition, a phase distribution of the composite structure may be obtained by simply summing the phase distributions of the main structural bodies.

In addition, the phase distributions of the main structural bodies may each have a cycle $\Lambda$ that satisfies Condition 1: $\Lambda \geq 5$ μm.

In addition, the main structural bodies may each have an in-plane existence probability P and a cycle $\Lambda$ that satisfy Condition 2: $P \geq 0.3\%$ and $\Lambda \geq 3$ μm.

In addition, the main structural bodies may each have an in-plane existence probability P, an existence region T, a cycle $\Lambda$, and a cycle perturbation $\delta$ that satisfy Condition 3:

$P \geq 0.2\%$, $\Lambda \geq 3$ μm, $T \geq 10\Lambda$, and $\delta \geq 30\%$ (Condition 3-1); or $P \geq 0.2\%$, $\Lambda \geq 4$ μm, $T > 10\Lambda$, and $\delta \geq 0\%$ (Condition 3-2).

According to another aspect of the present invention, there is provided a lighting device in which the above-described optical body is arranged on a surface of a light source.

According to another aspect of the present invention, there is provided an image display device in which the above-described optical body is arranged between a light source and a display unit.

Advantageous Effects of Invention

According to the present invention as described above, the homogeneous light distribution property of the optical body can be increased.

DESCRIPTION OF EMBODIMENTS

Figure 1:
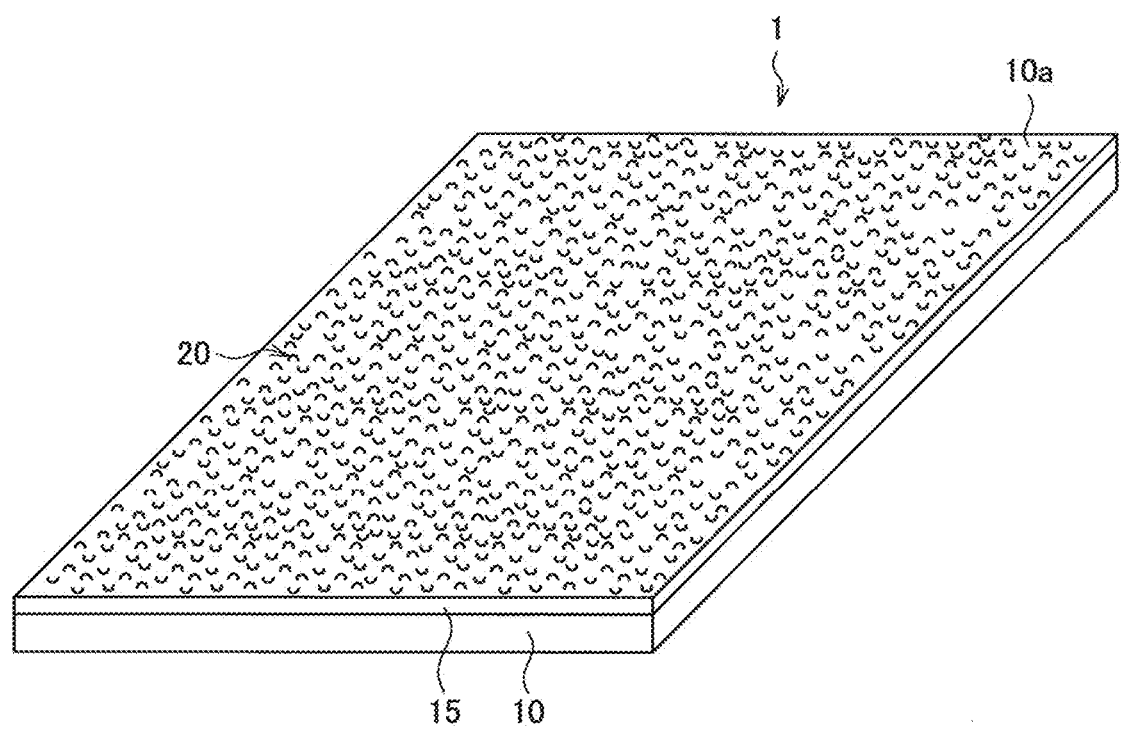
FIG. 1 FIG. 1 is a perspective view illustrating a structure of an optical body according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Overall Configuration of Optical Body>

First, an overall configuration of an optical body 1 according to the present embodiment will be described on the basis of FIG. 1 and FIG. 2. The optical body 1 is used as a light diffuser plate, for example, and includes a base material 10 and a composite structure layer 15 formed on a surface of the base material 10.

The base material 10 is a base material made from a material that can be regarded as transparent in the wavelength band of light incident upon the optical body 1 according to the present embodiment. This base material 10 may have a film form, or may have a plate form. The material of the base material is not particularly limited, but a publicly known resin such as, for example, polymethyl methacrylate (PMMA), polyethylene terephthalate (PET), polycarbonate (PC), cyclo olefin copolymer (COC), cyclo olefin polymer (COP), or triacetylcellulose (TAC) may be used as the base material 10, or a publicly known optical glass such as quartz glass, borosilicate glass, or highly transparent glass may be used. Although FIG. 1 illustrates a case in which the base material 10 is rectangular as an example, the shape of the base material 10 is not limited to rectangle, but may have an arbitrary shape (such as a circle, for example) in accordance with the shape of a device such as a lighting device or an image display device on which the optical body 1 is mounted, for example.

A composite structure 20 is formed in the composite structure layer 15. The composite structure 20 has a shape obtained by combining a large number of main structural bodies 30, and is formed continuously within the plane of the base material 10. A detailed configuration of the composite structure 20 and the main structural bodies 30 will be described later. The composite structure layer 15 includes a cured curing resin, for example. The cured curing resin is implemented by a resin that can be regarded as transparent in the wavelength band of light incident upon the optical body 1 according to the present embodiment. Examples of such a resin include an ultraviolet-curing acrylic resin, ultraviolet-curing epoxy resin, and the like.

<2. Detailed Configuration of Composite Structure 20 and Main Structural Bodies 30>

Next, a detailed configuration of the composite structure 20 and the main structural bodies 30 will be described on the basis of FIG. 2 to FIG. 6. As described above, the composite structure 20 has a shape obtained by combining a large number of main structural bodies 30.

Figure 2:
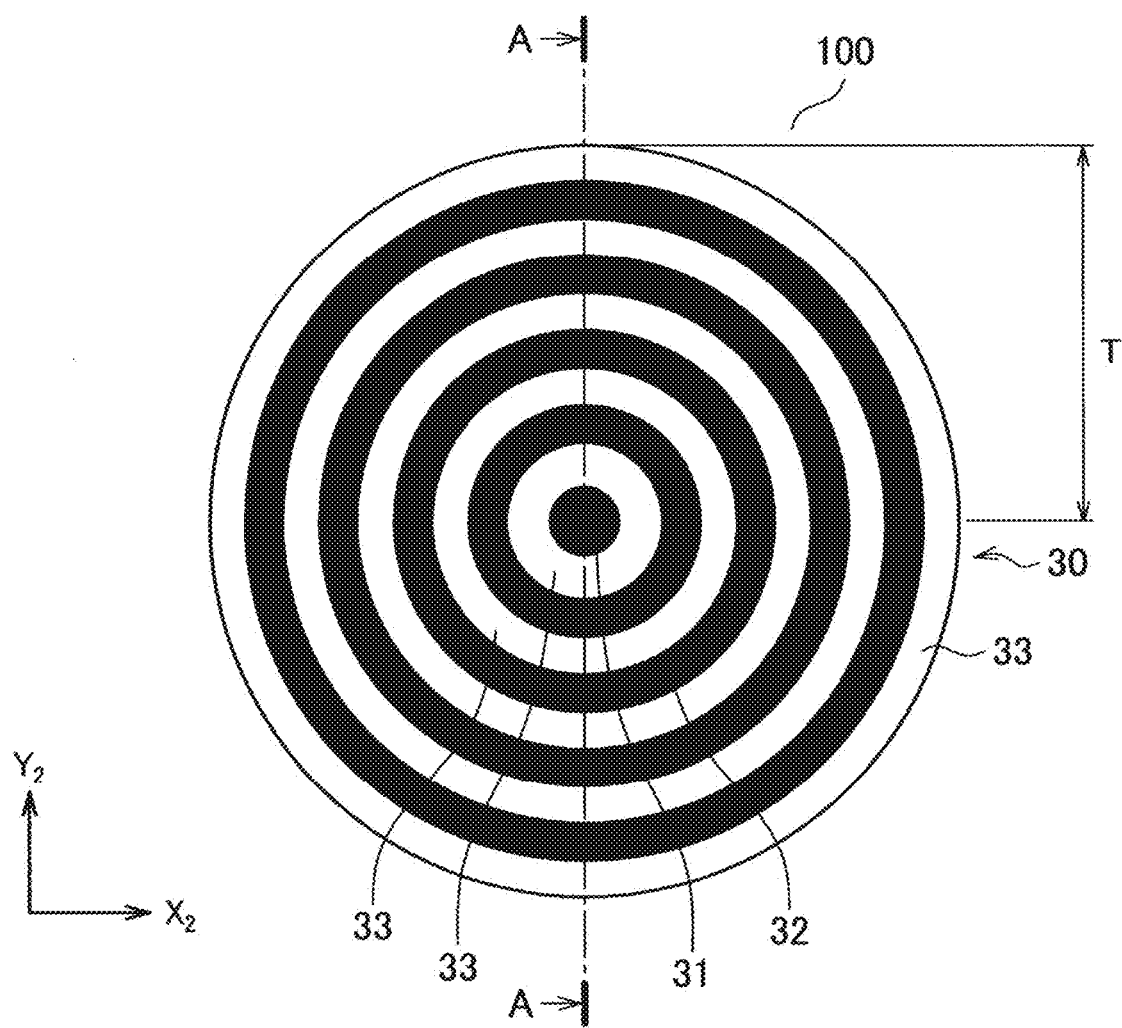
FIG. 2 is a plan view illustrating a structure of a main structural body according to the embodiment.
Figure 3:
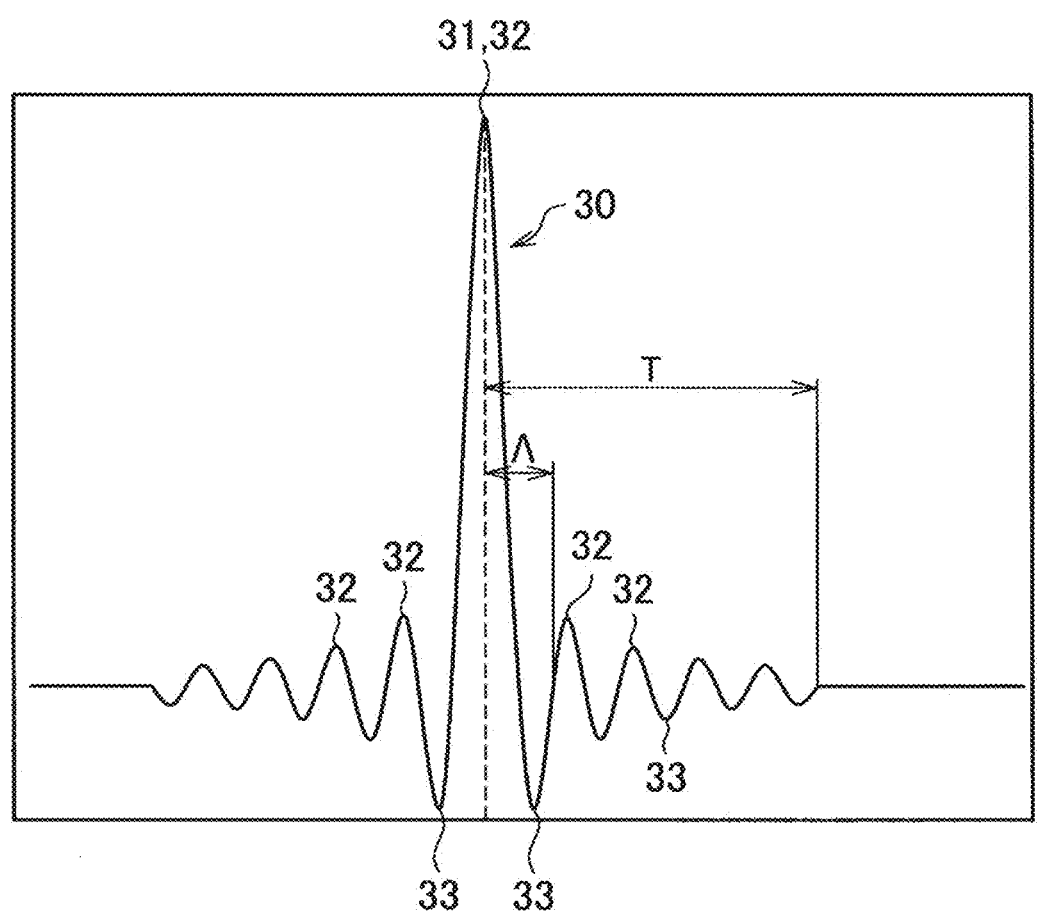
FIG. 3 is a cross-section diagram illustrating the structure of the main structural body.

FIG. 2 and FIG. 3 illustrate an exemplary structure of the main structural body 30. Note that FIG. 2 depicts the main structural body 30 on an $x_2y_2$ plane 100. The $x_2y_2$ plane 100 is a plane on which a pattern image equivalent to a design of the composite structure 20 is drawn. The pattern image is produced using an electronic computer, for example. The composite structure 20 drawn on the pattern image is formed in the plane of the base material 10. Therefore, the $x_2y_2$ plane 100 is a plane for defining the surface shape of the base material 10. A method for producing the pattern image will be described later. FIG. 3 is a cross-section diagram taken along the line A-A in FIG. 2.

A phase distribution of the main structural body 30 within the plane of the base material 10 (in other words, within the $x_2y_2$ plane 100) is equivalent to an amplitude distribution obtained by subjecting a pupil function of a two-dimensional optical aperture to Fourier transform. This amplitude distribution indicates an amplitude distribution (what is called a point spread function) in an image plane of the two-dimensional optical aperture. Herein, the pupil function is not particularly restricted as long as it substantially corresponds to a set light intensity distribution (a light intensity distribution of an assumed light source), but preferably is a pupil function in which the light intensity distribution indicates a Gaussian distribution, and more preferably is a pupil function (hereinafter also referred to as a "homogeneous pupil function") in which the light intensity distribution is uniform. In this case, the homogeneous light distribution property of the optical body 1 can be increased further. The following embodiment will be described provided that the pupil function is a homogeneous pupil function.

Figure 4:
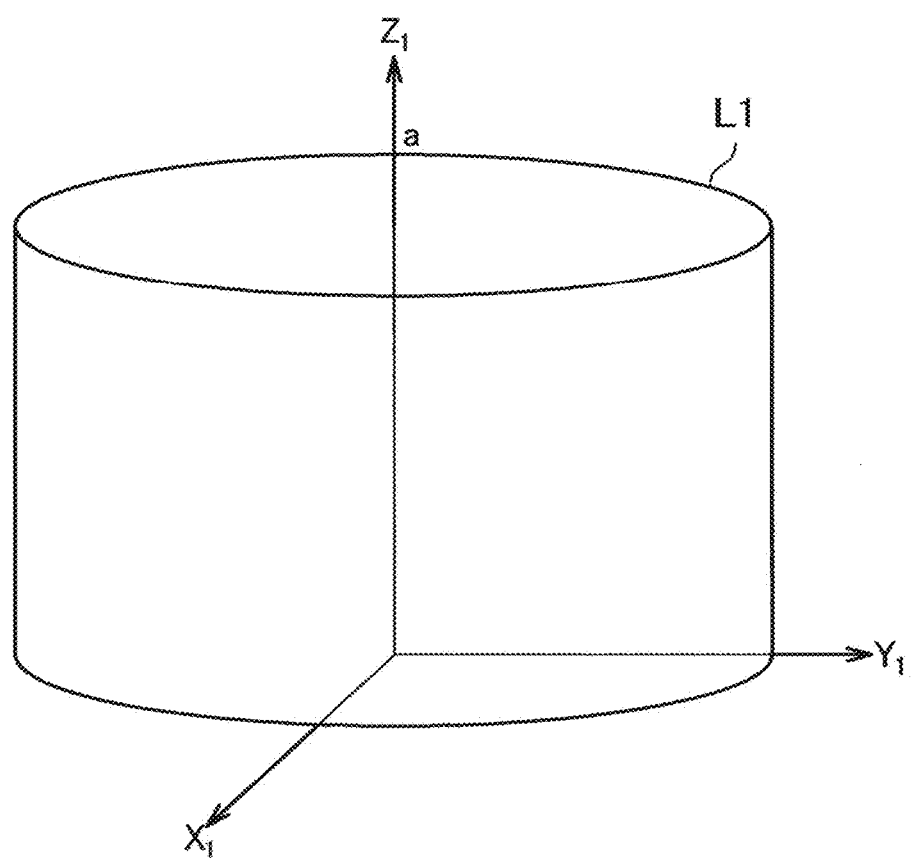
FIG. 4 is a graph illustrating an exemplary pupil function.

A graph L1 illustrated in FIG. 4 illustrates an exemplary homogeneous pupil function. The $x_1y_1$ plane in FIG. 4 is a plane on which an optical aperture (two-dimensional optical aperture) is drawn, and the $z_1$ axis indicates the light intensity. In this example, the optical aperture is circular, and the light intensity in the optical aperture is uniform (that is, the light intensity is a certain value, a), while the light intensity in the remaining region is zero. Note that the optical aperture is not necessarily limited to circle, but may have a rectangular, polygonal, or free shape.

The amplitude distribution obtained by subjecting such a homogeneous pupil function to Fourier transform in the whole aperture plane is expressed by a Sinc function, for example. Thus, in the present embodiment, the phase distribution (that is, an oscillation waveform) of the main structural body 30 is expressed by a Sinc function as illustrated in FIG. 2 and FIG. 3. More specifically, a central point 31 of the main structural body 30 is a zero-phase point, and a height $z_2$ of the main structural body 30 at a distance r from the central point 31 is expressed by Expressions (1) and (2) below. In Expressions (1) and (2), A denotes the amplitude (μm) of the main structural body 30, and $\Lambda$ denotes the cycle (μm) of the main structural body 30.

[Ex. 1]

$$z_2 = A \frac{\mathrm{Sin}(\pi a)}{\pi a} \quad (1)$$

$$a = \frac{2r}{\Lambda} \quad (2)$$

As illustrated in FIG. 2 and FIG. 3, the main structural body 30 has large numbers of convexities 32 and concavities 33, and variations in the height $z_2$ (that is, the height of the convexities 32 and the depth of the concavities 33) decrease as the distance r from the central point 31 increases.

The main structural body 30 has such a phase distribution for the following reason. That is, in a case of further performing Fourier transform (what is called a reverse Fourier transform) on the amplitude distribution obtained by subjecting the homogeneous pupil function to Fourier transform, the original homogeneous pupil function is obtained. For example, in the case where the amplitude distribution is expressed by a Sinc function, a Fourier transform image thereof is a homogeneous pupil function.

On the other hand, if considering the surface structure of the optical body 1 as a pupil function, the amplitude distribution of light transmitted through (or reflected by) the optical body 1 is considered equivalent to a Fourier-transformed oscillation waveform of the surface structure of the optical body 1. Therefore, if the surface structure of the optical body 1 is the composite structure 20 in which the above-described main structural bodies 30 are combined, (light fluxes of) light transmitted through the optical body 1 is considered as having an amplitude distribution equivalent to the above-described homogeneous pupil function. From such a reason, the main structural body 30 has a phase distribution equivalent to the amplitude distribution obtained by subjecting the homogeneous pupil function to Fourier transform. Accordingly, in the present embodiment, the homogeneous light distribution property of light transmitted through (or reflected by) the optical body 1 can be increased.

As illustrated in FIG. 3, the height $z_2$ the main structural body 30 has the maximum value at the convexity 32 at the central point 31, and has the minimum value at the concavity 33 closest to the central point 31. An optical path difference between light transmitted through the central point 31 and light transmitted through the concavity 33 closest to the central point 31 preferably is equal to a wavelength of light. Specifically, in a case where the wavelength of light incident upon the optical body 1 varies within a range of $\lambda_s$ to $\lambda_e$ (μm), the amplitude A of an m-th main structural body 30 arranged on the $x_2 y_2$ plane 100 preferably satisfies Expression (3) below. Note that the m-th main structural body 30 refers to the main structural body 30 at the m-th determined central point 31 in processing of determining the position of the central point 31 which will be described later.

[Ex. 3]

$$A = \frac{2(\lambda_s + (\lambda_e - \lambda_s) \cdot R_m)}{n} \quad (3)$$

In Expression (3), n denotes a relative refractive index of the composite structure layer 15, and $R_m$ denotes a random number (real number) of 0 to 1. In a case where the amplitude A is expressed by Expression (3), light having a high homogeneous light distribution property can be distributed with respect to arbitrary incoming light having a wavelength of $\lambda_s$ to $\lambda_e$ (μm).

Figure 5:
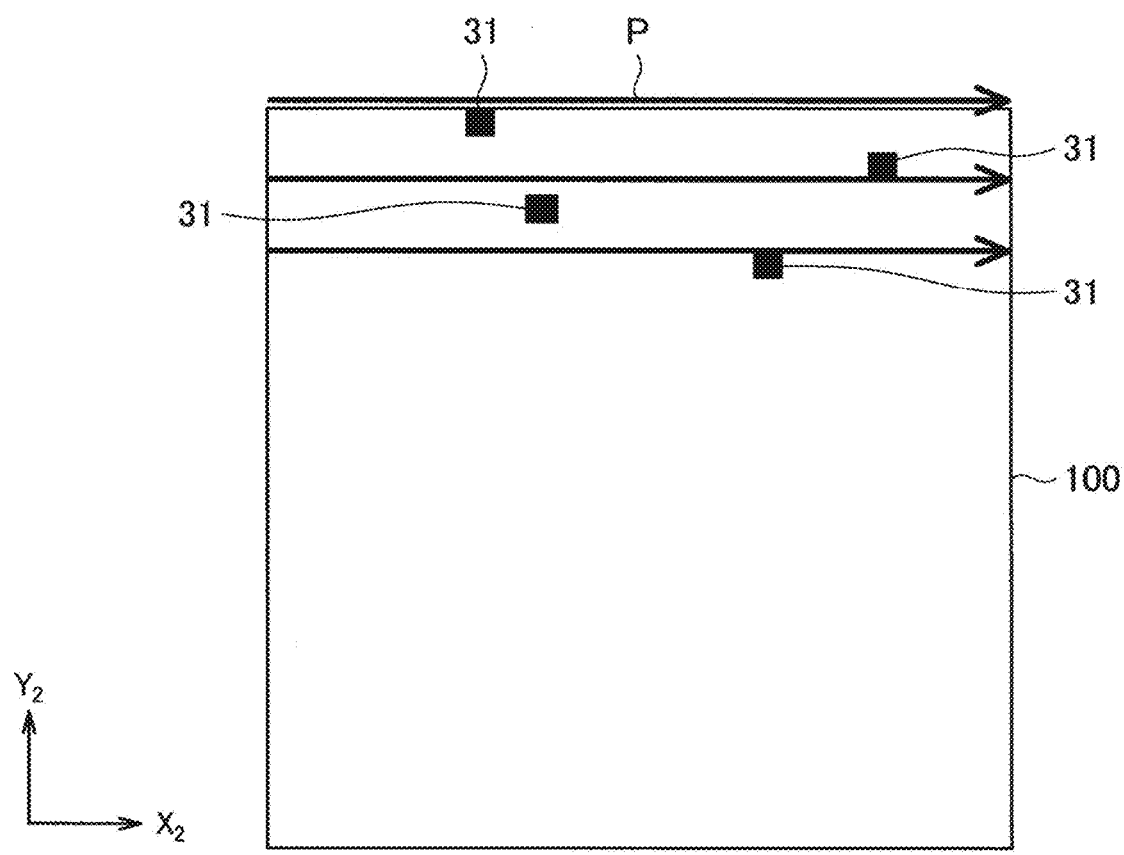
FIG. 5 is an explanatory diagram illustrating a procedure of producing a pattern image.

The composite structure 20 has a shape obtained by combining the large number of main structural bodies 30. Thus, a method of combining the main structural bodies 30 (a method of producing the composite structure 20) will be described first on the basis of FIG. 5 to FIG. 6. The composite structure 20 is produced by an electronic computer. First, as illustrated in FIG. 5, the $x_2 y_2$ plane 100 is set in a virtual space. The $x_2 y_2$ plane 100 is a group of a plurality of pixels. The shape and size of the $x_2 y_2$ plane 100, and its size in a real space corresponding to a pixel (what is called a resolution) may be set in accordance with the shape, size, and the like of the optical body 1 as actually produced. The resolution also depends on functions or the like of a device that performs exposure, but preferably is set at approximately 0.2 to 0.8 μm/px in order to increase the accuracy of the composite structure 20. The size of the $x_2 y_2$ plane 100 is specified by the number of pixels constituting the $x_2 y_2$ plane 100. For example, in the case where the $x_2 y_2$ plane 100 is rectangular, the size of the $x_2 y_2$ plane 100 is defined by multiplying the number of pixels on the longer side by the number of pixels on the shorter side. A value obtained by multiplying the size of the $x_2 y_2$ plane 100 by the resolution is the size of the optical body 1 in a real space, particularly, the size of the surface of the base material 10.

Then, the $x_2 y_2$ plane 100 is scanned in an $x_2$ direction (the direction of an arrow P) per pixel. Then, it is determined whether or not to arrange the central point 31 of the main structural body 30 for each pixel, on the basis of an in-plane existence probability P (%). The in-plane existence probability P is set by an operator (an operator who produces the optical body 1). When scanning for the same $y_2$ coordinate is finished, the scanning position is shifted in the $y_2$ direction by one pixel, and similar processing is repeated until scanning of the whole $x_2 y_2$ plane 100 is finished. Accordingly, the central points 31 are arranged at arbitrary positions on the $x_2 y_2$ plane 100.

Figure 6:
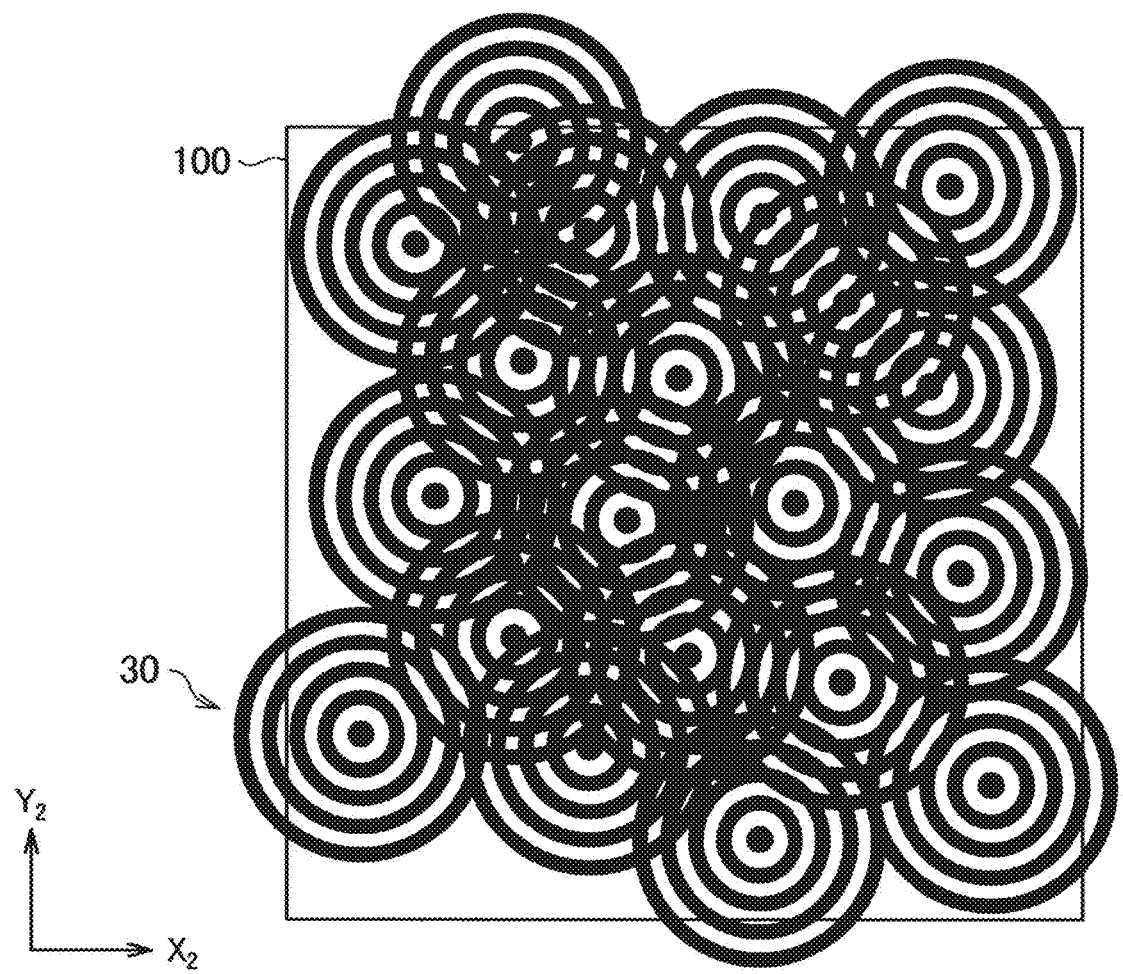
FIG. 6 is an explanatory diagram illustrating the procedure of producing the pattern image.

Then, as illustrated in FIG. 6, the main structural body 30 is arranged at each of the central points 31 in accordance with the amplitude A, the cycle $\Lambda$, the existence region T, and the cycle perturbation $\delta$ of the main structural body 30 previously set by the operator. Herein, the existence region T is equivalent to the radius of the main structural body 30 on the $x_2 y_2$ plane 100, and is a value of an integral multiple of the cycle $\Lambda$ (T=$\alpha\Lambda$ where $\alpha$ is an integer, and indicates the number of repetition of the cycle $\Lambda$). The cycle perturbation $\delta$ (%) indicates a variation of the cycle $\Lambda$, and for each of the main structural bodies 30 a specific value of the cycle $\Lambda$ is determined randomly within a range of cycle perturbation. In a case where the cycle perturbation is $\beta$ %, the cycle $\Lambda$ of each of the main structural bodies 30 is the cycle $\Lambda \pm$(the cycle $\Lambda \times \beta$ %).

Then, the main structural bodies 30 are combined. Specifically, the heights $z_2$ of the main structural bodies 30 are simply summed for each pixel on the $x_2y_2$ plane 100. Accordingly, the composite structure 20 is formed on the $x_2y_2$ plane 100. That is, the height $z_2$ of the composite structure 20 in each pixel on the $x_2y_2$ plane 100 is a simple summation of the heights $z_2$ of the main structural bodies 30 arranged randomly on the $x_2y_2$ plane 100. Note that the combining method is not limited to the simple summation, but another combining method may be adopted.

The pattern image is thereby produced. The height $z_2$ of the composite structure 20 in the pattern image is expressed by gradation of colors of pixels, for example. Therefore, the pattern image is what is called a bit map image. Note that the height $z_2$ of each portion of the composite structure 20 in a real space is defined as follows. That is, a $z_2$ axis is defined in the height (thickness) direction of the base material 10, and a direction away from the base material 10 is the positive direction. Then, the origin w % here $z_2=0$ (a point at which the phase of the Sinc function is zero) is defined on the $z_2$ axis. The height $z_2$ of each portion of the composite structure 20 is defined as a coordinate value on the $z_2$ axis defined in this manner. A difference $\delta Z$ between the maximum value and the minimum value of the height $z_2$ in the whole area of the composite structure 20 preferably is more than or equal to 4.5. In this case, it is expectable that the homogeneous light distribution property of light is increased further.

Then, a master (having a surface in which an inverted shape of the composite structure 20 has been formed) is produced on the basis of this pattern image, and the optical body 1 is produced using this master as a transfer mold. The composite structure 20 designed by the pattern image is formed on the optical body 1. Light transmitted through or reflected by this optical body 1 has a high homogeneous light distribution property. Specifically, the peak ratio value of the optical body 1 is less than or equal to 2.5. The peak ratio value is defined as a ratio between a peak level and a base level of a light luminance profile. The luminance profile indicates a luminance at each position on a screen irradiated with diffusion light.

Figure 32:
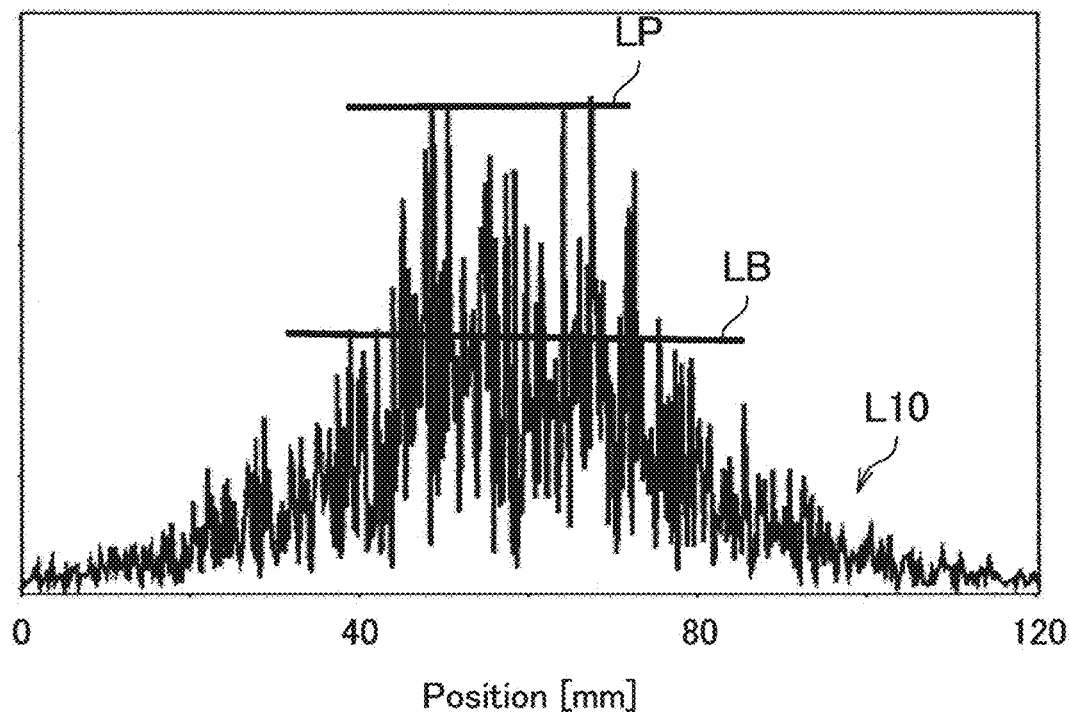
FIG. 32 is a luminance profile illustrating an exemplary peak ratio value.
Figure 33:
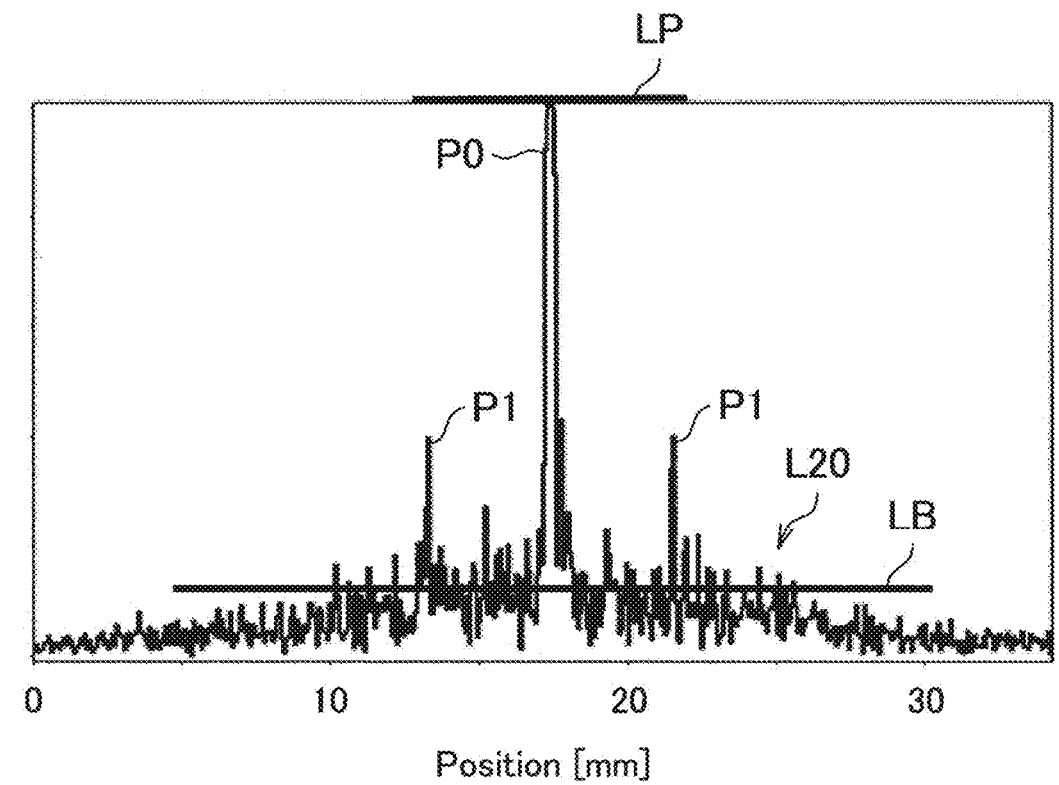
FIG. 33 is a luminance profile illustrating an exemplary peak ratio value.

Herein, an exemplary peak ratio value will be described on the basis of FIG. 32 and FIG. 33. A graph L10 illustrated in FIG. 32 is an exemplary luminance profile in which the peak ratio value is less than or equal to 2.5 (that is, a kind of examples of the present embodiment), and a graph L20 illustrated in FIG. 33 is an example in which the peak ratio value is more than 2.5 (that is, a kind of comparative examples of the present embodiment). The horizontal axis in FIG. 32 and FIG. 33 indicates the positon on the screen, and the vertical axis indicates the luminance. A peak level LP is defined as the maximum value of the luminance profile. On the other hand, a base level LB is defined as an average (arithmetic mean) luminance level in a region where the amplitude frequency is large. As illustrated in FIG. 32, in the luminance profile in which the peak ratio value is less than or equal to 2.5, the luminance is homogeneous on the screen. On the other hand, as illustrated in FIG. 33, in the luminance profile in which the peak ratio value is more than 2.5, a peak P0 of zeroth-order light or a peak P1 of first-order light is extremely large, and the homogeneous light distribution property is degraded.

Note that in order for the peak ratio value of the optical body 1 to be less than or equal to 2.5, the in-plane existence probability P, the existence region T, the cycle $\Lambda$, and the cycle perturbation $\delta$ of the main structural body 30 need to satisfy at least one or more of following Conditions 1 to 3.

Condition 1:

$\Lambda \geq 5$ μm

Condition 2:

$P \geq 0.3\%$ and $\Lambda \geq 3$ μm

Condition 3:

$P \geq 0.2\%$, $\Lambda \geq 3$ μm, $T \geq 10\Lambda$, and $\delta \geq 30\%$ (Condition 3-1) or $P \geq 0.2\%$, $\Lambda \geq 4$ μm, $T > 10\Lambda$, and $\delta \geq 0\%$ (Condition 3-2)

Herein, in a case of radiating diffusion light from the diffuser plate onto the screen, a macro-like mottled pattern (what is called a macro mottle) is observed in some cases in the irradiated region in the screen. Such a mottled pattern is one of causes that deteriorate the homogeneous light distribution property. As will be inspected in examples which will be described later, the optical body 1 according to the present embodiment can prevent such a mottled pattern from occurring.

As described above, according to the present embodiment, the composite structure 20 of the optical body 1 has a shape obtained by combining the main structural bodies 30. Then, the phase distribution of the main structural body 30 is equivalent to the amplitude distribution obtained by subjecting a pupil function of a two-dimensional optical aperture (that is, a homogeneous pupil function) whose light intensity distribution is uniform to Fourier transform. Accordingly, the optical body 1 can output diffusion light having high efficiency and high homogeneous light distribution property (with few macro mottles) with respect to various types of incoming light (for example, collimating light or another type of light). Note that the pupil function is not necessarily limited to the homogeneous pupil function, but is not particularly restricted as long as it substantially corresponds to a set light intensity distribution (a light intensity distribution of an assumed light source). For example, the pupil function may be a pupil function in which the light intensity distribution represents a Gaussian distribution, and it is believed that effects similar to those described above are obtained in this case as well.

Diffusion light output from this optical body 1 has extremely few macro mottles, favorable visibility, and high homogeneity. Therefore, the optical body 1 efficiently contributes to effects such as reflection, transmittance, interference, absorption, or wave guidance of incoming light. That is, in the present embodiment, by controlling a light distribution component of reflected light with respect to incoming light incident upon the composite structure 20 of the optical body 1, or controlling a light distribution component of a transmitted light flux, diffusion with a homogeneous energy distribution and with few macro mottles is achieved.

A sheet film body or various devices to which the optical body 1 is applied is excellent in light homogeneous diffusion function and optical aperture enlarging function by virtue of high homogeneity of diffusion light. Therefore, by applying the optical body 1 of the present embodiment to a device such as a backlight, a common or special lighting device, or an image display device that displays a highly luminous, high-gradation (such as 8-bit, 16-bit, or 24-bit, for example), and high-quality image, such a device can be significantly increased in accuracy and reliability. The optical body 1 is also applicable to various devices including those described above, such as a lighting device, an image display device, an optical measuring device, a measurement medical device, and a UV light employing device, for example.

<3. Method of Manufacturing Optical Body>

Next, a method of manufacturing the optical body 1 will be described in line with the flow chart illustrated in FIG. 7. In Step S100, a pattern image is produced. For producing a pattern image, an electronic computer capable of producing a pattern image is prepared first. The electronic computer includes, as a hardware configuration, a central processing unit (CPU, that is, a processor), a random access memory (RAM), a read only memory (ROM), a hard disk, various input operation devices (such as a keyboard and a mouse), a display, a communication device, and the like. Information required for processing in the electronic computer, and in particular, a program required for production of a pattern image, and the like are recorded on the ROM. The CPU reads out and executes a program stored in the ROM.

An operator first inputs the shape, size, and resolution of a pattern image, as well as the in-plane existence probability P, the amplitude A, the cycle Λ, the existence region T. and the cycle perturbation δ of the main structural body 30 to the electronic computer. For the existence region T, the repetition number α may be input (T=αΛ). In addition, convexities and concavities of the main structural body 30 may be inverted. In this case, the operator inputs information indicating that convexities and concavities of the main structural body 30 are to be inverted to the electronic computer.

Then, the electronic computer produces a pattern image on the basis of the information supplied by the operator. First, the electronic computer sets the $x_2y_2$ plane 100 in a virtual space, as illustrated in FIG. 5. The shape and size of the $x_2y_2$ plane 100 are set on the basis of the shape and size of the input pattern image. Then, the electronic computer scans the $x_2y_2$ plane 100 in the $x_2$ direction (the direction of the arrow P) per pixel. Then, the electronic computer determines, for each pixel, whether or not to arrange the central point 31 of the main structural body 30 on the basis of the in-plane existence probability P (%). When scanning for the same $y_2$ coordinate is finished, the scanning position is shifted in the $y_2$ direction by one pixel, and similar processing is repeated until scanning of the whole $x_2y_2$ plane 100 is finished. Accordingly, the central points 31 are arranged at arbitrary positons on the $x_2y_2$ plane 100.

Then, as illustrated in FIG. 6, the electronic computer arranges the main structural body 30 at each of the central points 31 in accordance with the amplitude A, the cycle Λ, the existence region T, and the cycle perturbation δ of the main structural body 30 previously set by the operator.

Then, the electronic computer combines the main structural bodies 30. Specifically, the electronic computer simply sums the heights $z_2$ of the main structural bodies 30 for each pixel on the $x_2y_2$ plane 100. Accordingly, the composite structure 20 is formed on the $x_2y_2$ plane 100. That is, a pattern image is produced. Note that the combining method is not limited to the simple summation, but another combining method may be adopted. Note that processing of Step S100 may be performed at arbitrary timing before processing of Step S105 is performed.

Then, in Step S101, the operator cleans a substrate. Such a substrate may have a roll shape such as a glass roll, or may have a planar shape such as a glass wafer, for example. Alternatively, the substrate may be a silicon wafer.

In Step S103, the operator forms a resist on the surface of the substrate after cleaning. Herein, examples of the resist include a resist through use of a metal oxide and a resist through use of an organic substance. The resist may be a positive or negative photoresist. Specific examples of the resist include PMER-LA900 made by TOKYO OHKA KOGYO CO., LTD, and AZ4620 made by AZ Electronic Materials. A coupling agent may be added to the resist. The resist may have a thickness of approximately 2 to 15 μm, for example. Processing of forming such a resist is achieved by application processing or dipping on a roll-shaped substrate, and achieved by any type of coating treatment on a planar substrate.

Then, in Step S105, processing of exposing the substrate on which the resist has been formed is performed. To such exposure processing, various publicly known exposure methods such as exposure through use of a gray scale mask (including multiple exposure achieved by overlapping a plurality of gray scale masks), grayscale exposure on a planar plate or roll plate, and laser exposure through use of a pico-second pulse laser, femto-second pulse laser, or the like can be applied as appropriate. The operator inputs the above-described pattern image to a device with which exposure processing is performed. The device performs exposure on the basis of the pattern image. The wavelength of laser may be selected as appropriate, but may be 405 nm, 436 nm, or the like as an example. These devices expose the resist on the basis of the pattern image. Exposure is performed per pixel in accordance with the resolution.

In Step S107, the operator subjects the substrate after exposure to alkaline development. Examples of a development solution include NMD-3, NMD-7, PMER P-7G (all made by TOKYO OHKA KOGYO CO., LTD., and having equivalent components) and tetramethylammonium hydroxide (TMAH).

In Step S111, the operator produces a master. For example, the operator may perform etching (such as, for example, glass etching through use of $CF_4$ gas, Ar gas, or the like) on the substrate after the alkaline development to produce a master (such as a glass master). Alternatively, the operator may perform Ni sputtering (equivalent to 20 to 60 nm, for example), electroforming pretreatment, or the like on the substrate after the alkaline development, and thereafter may perform Ni electroforming to separate a coated body from the substrate. This coated body may be used as a master (metal master). The electroforming pretreatment is performed by, for example, immersing the substrate after the development into a Ni bath such as a nickel sulfamate bath. The thickness of the coated body may be selected as appropriate. Convexities and concavities shaped similarly to the composite structure 20 are formed in the surface of the master.

In Step S113, the operator produces a mold such as a soft mold using the completed master. For example, the operator applies an uncured curing resin to a base material, and presses the convexities and concavities of the master to the uncured curing resin layer. The curing resin is cured in this state. A soft mold is produced through these steps. The materials of the base material and the curing resin may be similar to the material of the optical body 1. Convexities and concavities having an inverted shape of the composite structure 20 are formed in the surface of the soft mold.

In Step S115, the operator performs transfer processing of transferring the composite structure 20 onto the base material 10 using the mold. For example, the operator applies the uncured curing resin onto the base material 10, and presses the convexities and concavities of the mold to the uncured curing resin layer. The curing resin is cured in this state. The optical body 1 is thereby produced. In Step S117, the operator deposits a protection film or the like on the surface of the optical body 1 according to necessity. The optical body 1 is produced through these steps. Note that the step of producing the soft mold may be omitted, and the optical body 1 may be produced directly from the master. In this case, convexities and concavities having an inverted shape of the composite structure 20 are formed in the surface of the master.

Figure 7:
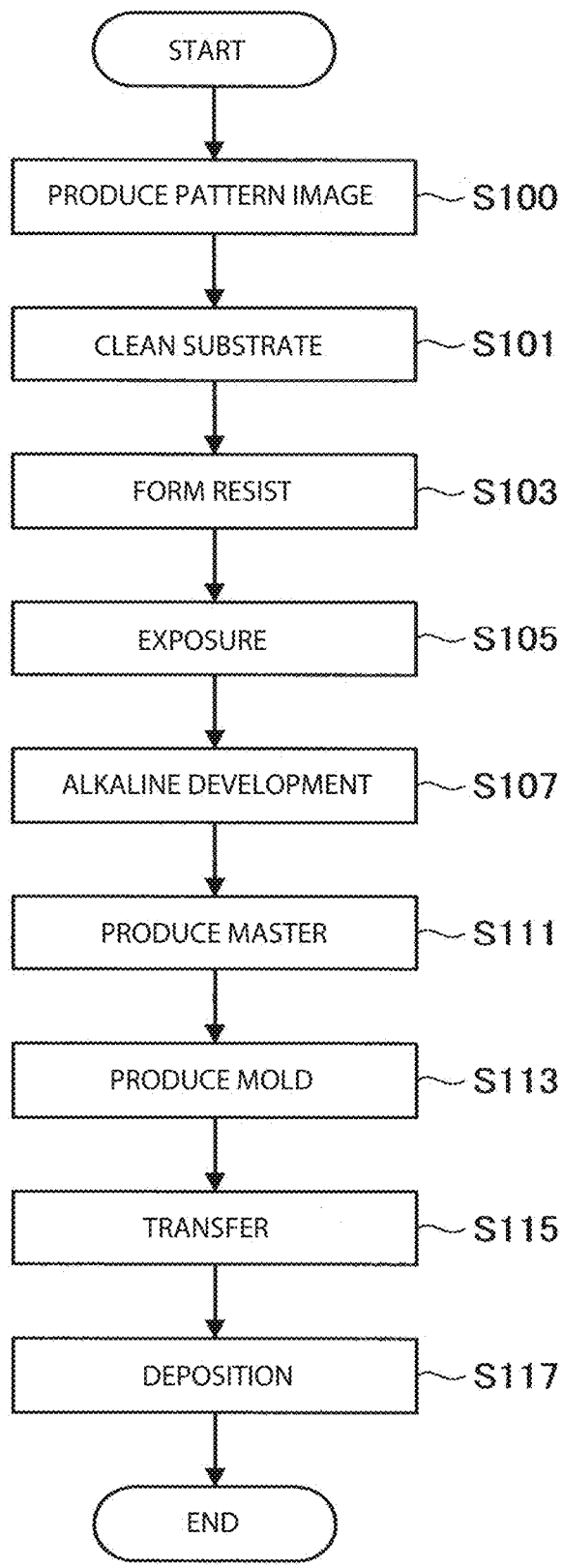
FIG. 7 is a flow chart illustrating a procedure of producing an optical body.

Note that the flow of the manufacturing method illustrated in FIG. 7 is merely an example, and the method of manufacturing the optical body 1 according to the present embodiment is not limited to the example illustrated in FIG. 7.

<4. Application Example of Optical Body>

An application example of the optical body is not particularly restricted, but the optical body may be applied to any field in which a homogeneous light distribution property of diffusion light is required. The optical body 1 may be applied to devices such as, for example, a lighting device, an image display device, an optical measuring device, a measurement medical device, and a UV light employing device. In a case of applying the optical body 1 to a lighting device, the optical body 1 may be arranged on a surface of a light source. In a case of applying the optical body 1 to an image display device, the optical body 1 may be arranged between a light source and a display unit. In either case, the type of the light source is not particularly limited. The light source may be one that outputs telecentric light including collimating light or parallel chief rays, or may be another type of light source.

EXAMPLES

1. Examples A to E

In Examples A to E, the optical bodies 1 were actually produced, and their light distribution properties were evaluated. The light distribution properties of Examples A to E were also evaluated through simulations together.

1-1. Example A

In Example A, the optical body 1 was produced in accordance with the above-described manufacturing method. Giving an overview, electroforming pretreatment or the like was performed on the substrate after the alkaline development, and thereafter, Ni electroforming was performed to separate the coated body from the substrate. Then, this coated body was used as a master (metal master). Note that the shape of the pattern image was rectangular, the size was 200×200 px (rectangular), the resolution was 0.8 μm/px, the in-plane existence probability P was 0.1%, the amplitude A was a value satisfying Expression (3) above (the wavelength of light was set at 532 nm), the cycle Λ was 5 μm, the existence region T was 50 Λ, and the cycle perturbation δ was 10%. In addition, the refractive index of the base material 10 and the composite structure layer 15 was 1.5, and the thickness of the base material 10 was 100 μm.

Figure 8:
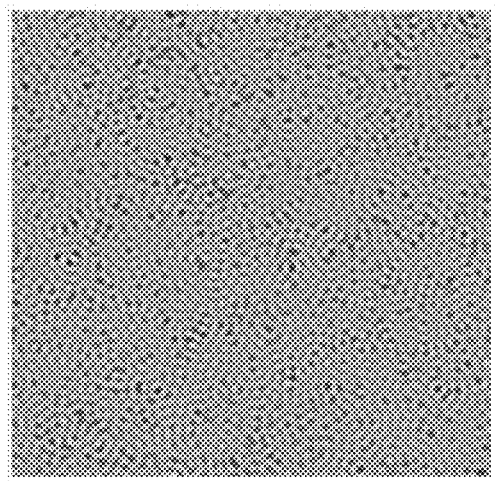
FIG. 8 is a bit map image illustrating an exemplary pattern image according to an example.
Figure 30:
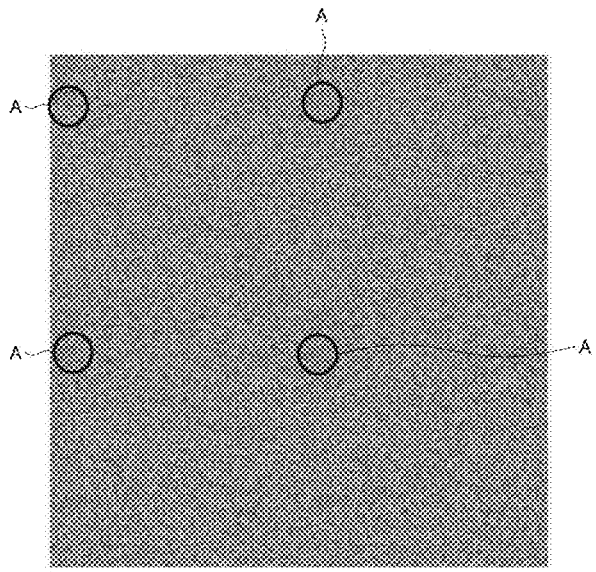
FIG. 30 is a bit map image of a microlens array.

FIG. 8 illustrates a pattern image. In this pattern image, the height $z_2$ of the composite structure 20 is depicted in eight gray levels. As is apparent from FIG. 8, it is understood that convexities and concavities of the composite structure 20 are distributed randomly in the pattern image. The inventor of the present invention produced a pattern image of a microlens array illustrated in FIG. 30 for comparison. In this example, the diameter of microlenses in plan view was set at 15 μm, and the diameter was varied under a perturbation of 5% for each microlens. Furthermore, the radius of curvature of each microlens was set at 8 μm, and the radius of curvature was varied under a perturbation of 5% for each microlens. Note that the pattern image of FIG. 30 was obtained by tiling the same pattern image in a 2×2 array. As is apparent from this example, regions A in which convexities and concavities are close to each other in shape are present in a scattered manner. Such regions A may cause macro mottles. In Example A without such regions A, macro mottles are prevented from occurring.

Figure 9:
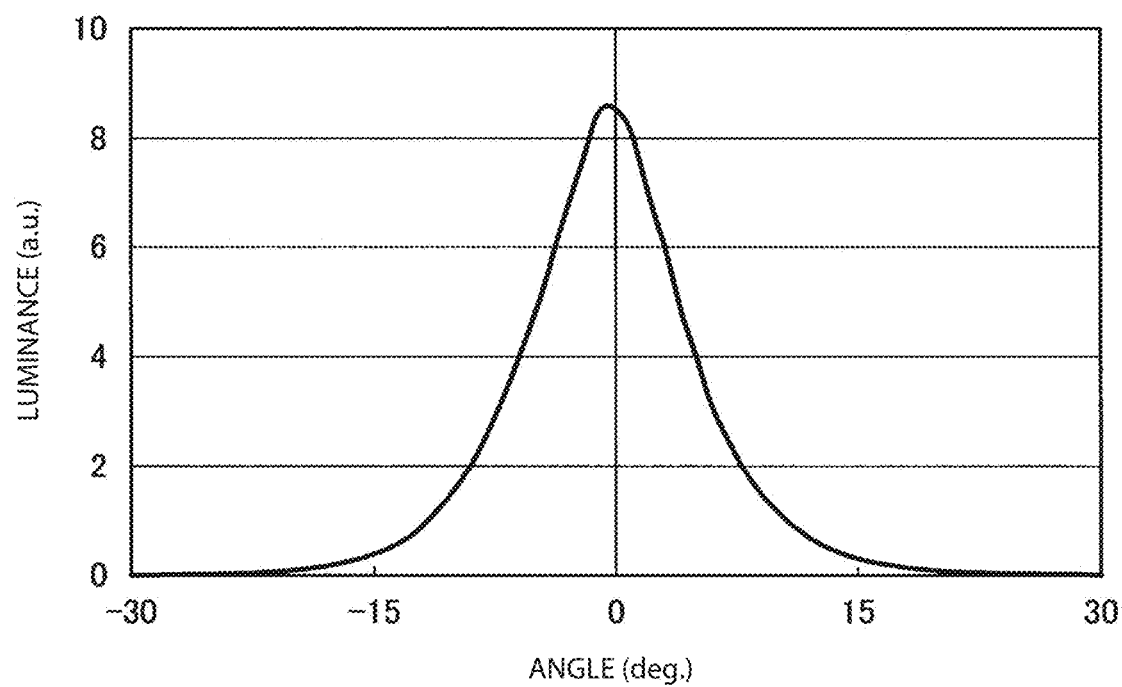
FIG. 9 is a graph illustrating an exemplary light distribution property of the optical body according to an example.

Next, the light distribution property of this optical body 1 was evaluated. Mini-Diff made by CYBERNET SYSTEMS CO., LTD, was used as a measurement device. Collimating light having a wavelength of 650 nm was incident upon the optical body 1 from the base material 10 side, and the luminance distribution of diffusion light was measured within a 20-mm aperture. An average value was measured for each angle of incidence of diffusion light upon the aperture, and was determined as a luminance value. The result is illustrated in FIG. 9. The horizontal axis indicates the angle of incidence of diffusion light, and the vertical axis indicates the luminance. As is apparent from this example, a distribution having a high homogeneous light distribution property is obtained.

Figure 10:
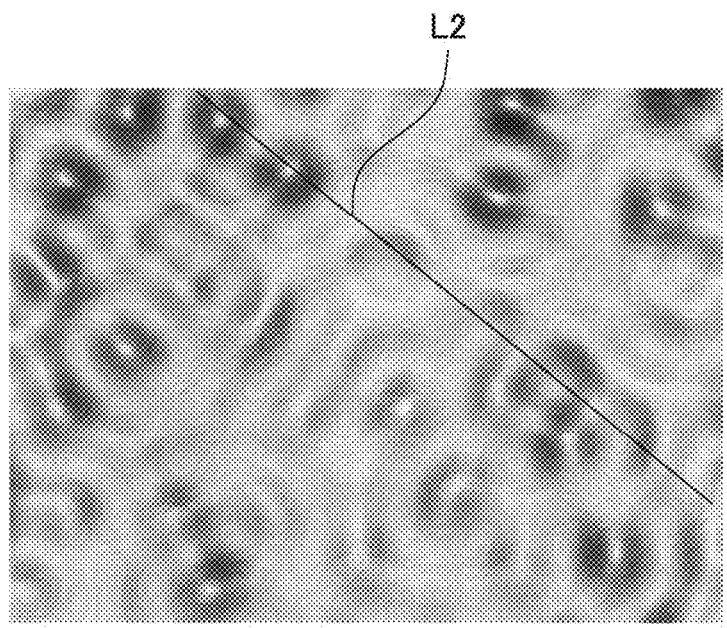
FIG. 10 is a confocal microscopic image illustrating a structure of a composite structure.
Figure 11:
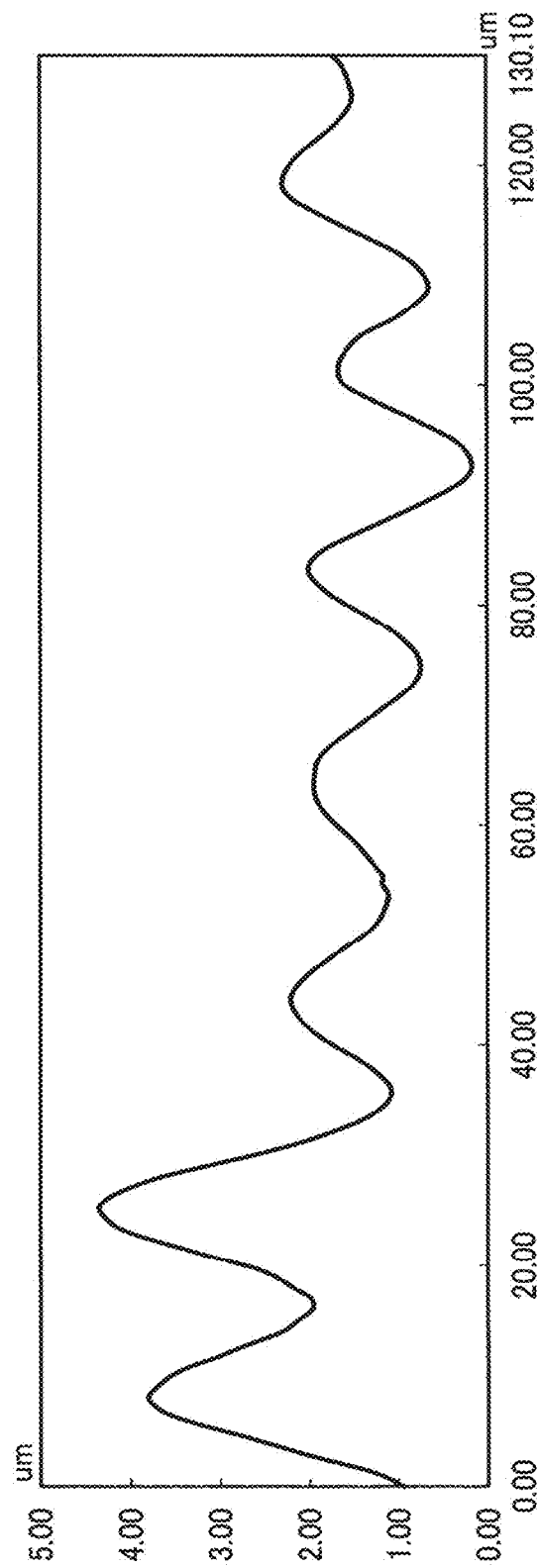
FIG. 11 is a cross-section diagram illustrating the structure of the composite structure.

FIG. 10 illustrates a confocal microscopic image of the composite structure 20 of the optical body 1. FIG. 11 illustrates a cross-sectional shape of the composite structure 20 taken along a straight line L2 illustrated in FIG. 10, and specifically, the cross-sectional shape presents a cross-sectional profile of the confocal microscopic image of a surface structure illustrated in FIG. 10. The vertical axis illustrated in FIG. 11 indicates the height from the surface of the base material 10, and the horizontal axis indicates the position on the straight line L2. As is apparent from FIG. 10 and FIG. 11, it is understood that the composite structure 20 is formed on the surface of the optical body 1. In addition, since the composite structure 20 is obtained by combining the main structural bodies 30 arranged randomly within the plane of the base material 10, the height $z_2$ varies randomly.

Figure 12:
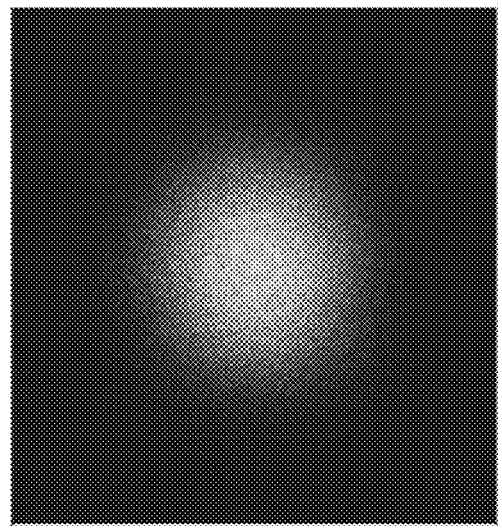
FIG. 12 is a simulation image illustrating a light distribution property of the optical body according to an example.
Figure 13:
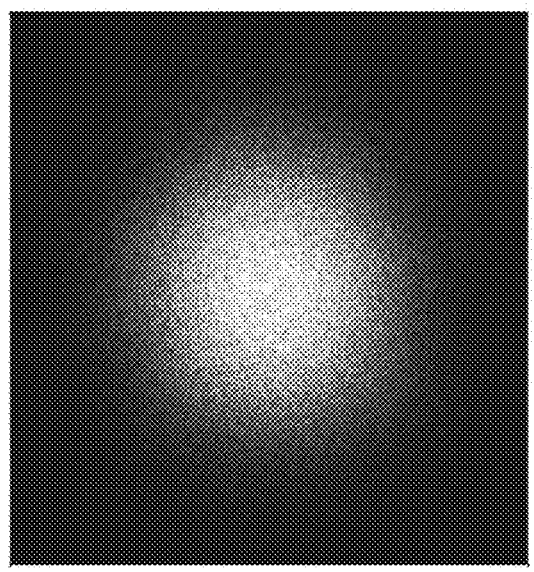
FIG. 13 is a simulation image illustrating a light distribution property of the optical body according to an example.

The inventor of the present invention evaluated the light distribution property of the optical body 1 through a simulation. Virtual-Lab made by Siemens AG was used as software for the simulation. Conditions for the simulation are as follows. That is, a collimating light source having a diameter of 0.8 mm was used as a light source, and the wavelength was 532 nm (and additional wavelengths were 473 nm and 635 nm). The optical body 1 had a circular shape having a diameter of 0.8 mm, and the thickness of the base material 10 was 100 μm. Furthermore, the refractive index of the base material and the composite structure layer 15 was set at 1.5. Then, collimating light was incident from the base material 10 side, and a virtual screen plane away from the optical body 1 by 100 mm was irradiated with diffusion light. The results are illustrated in FIG. 12 and FIG. 13. FIG. 12 illustrates a projection image projected on the screen when light having a wavelength of 532 nm was incident upon the optical body 1, and FIG. 13 illustrates a projection image projected on the screen when synthetic light having wavelengths of 473 nm, 532 nm, and 635 nm was incident upon the optical body 1. The peak ratio value is calculated on the basis of the luminance distribution of this projection image. It is understood that diffusion light has high homogeneity in both the examples.

1-2. Example B

Figure 14:
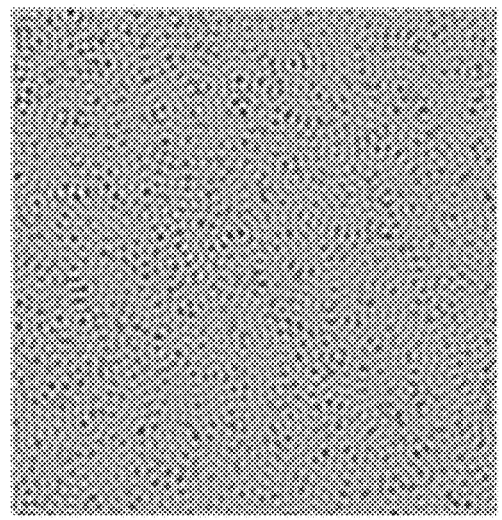
FIG. 14 is a bit map image illustrating an exemplary pattern image according to an example.

In Example B, the optical body 1 was produced under conditions similar to those in Example A except that the cycle perturbation was 10%, and the light distribution property was evaluated by a method similar to that of Example A. FIG. 14 illustrates a pattern image. In this pattern image, the height $z_2$ of the composite structure 20 is depicted in eight gray levels. As is apparent from FIG. 14, it is understood that convexities and concavities of the composite structure 20 are distributed randomly in the pattern image.

Figure 15:
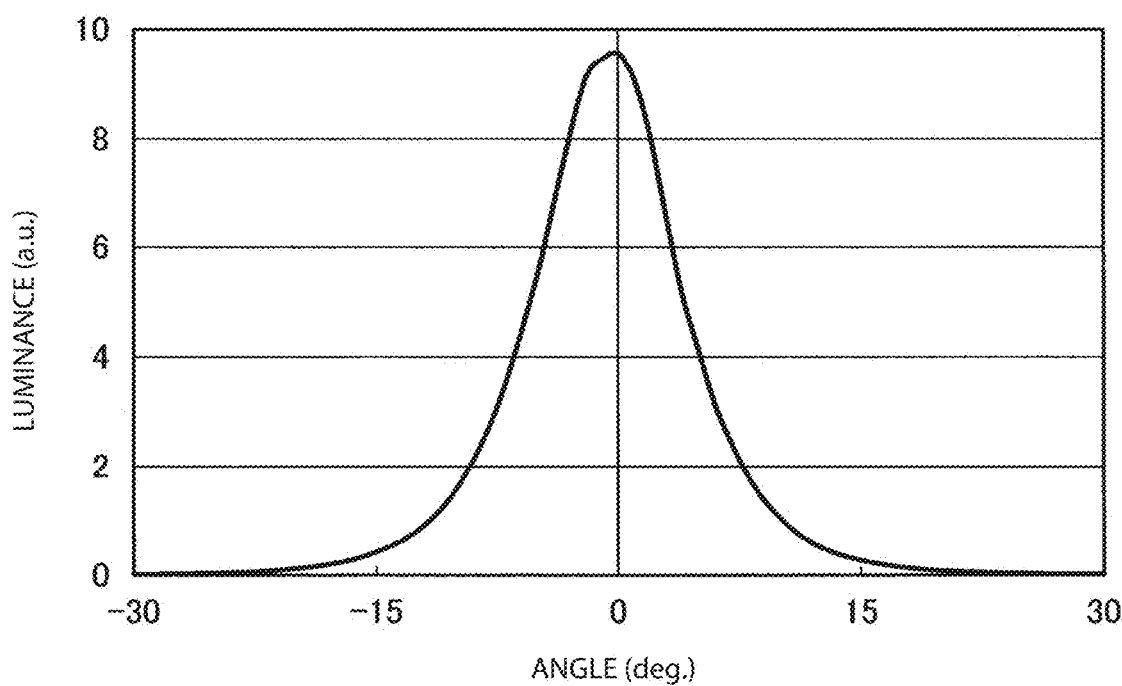
FIG. 15 is a graph illustrating an exemplary light distribution property of an optical body according to an example.
Figure 16:
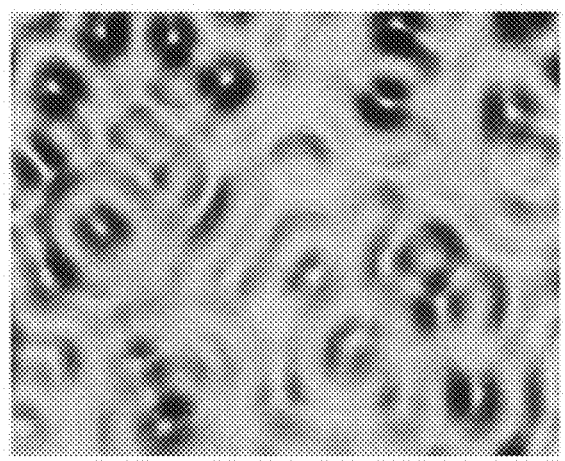
FIG. 16 is a confocal microscopic image illustrating a structure of a composite structure.

FIG. 15 illustrates a light distribution property measured using Mini-Diff. In Example B, a distribution having a high homogeneous light distribution property is also obtained. FIG. 16 illustrates a confocal microscopic image of the composite structure 20 of the optical body 1. As is apparent from FIG. 16, it is understood that the composite structure 20 has been formed on the surface of the optical body 1.

Figure 17:
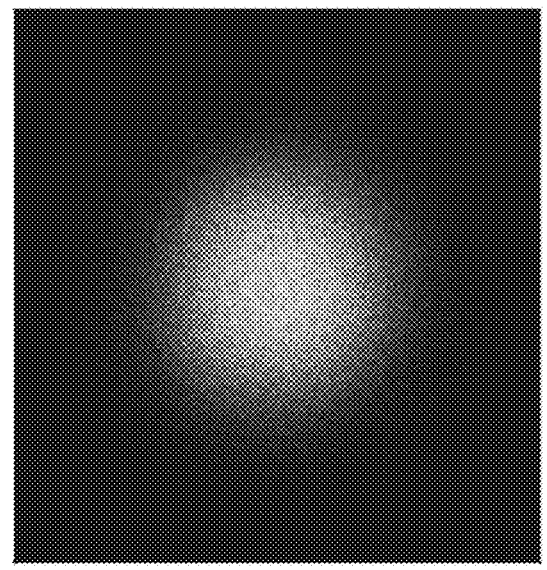
FIG. 17 is a simulation image illustrating a light distribution property of the optical body according to an example.
Figure 18:
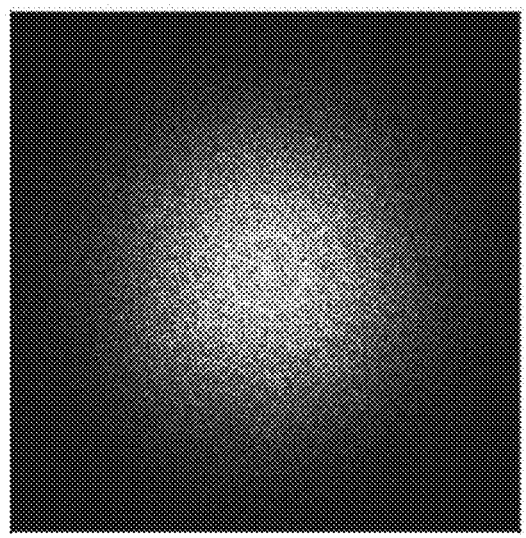
FIG. 18 is a simulation image illustrating a light distribution property of the optical body according to an example.

FIG. 17 and FIG. 18 illustrate results of simulations. FIG. 17 illustrates a projection image projected on a screen when light having a wavelength of 532 nm was incident upon the optical body 1, and FIG. 18 illustrates a projection image projected on a screen when synthetic light having wavelengths of 473 nm, 532 nm, and 635 nm was incident upon the optical body 1. It is understood that diffusion light has high homogeneity in both the examples.

1-3. Example C

Figure 19:
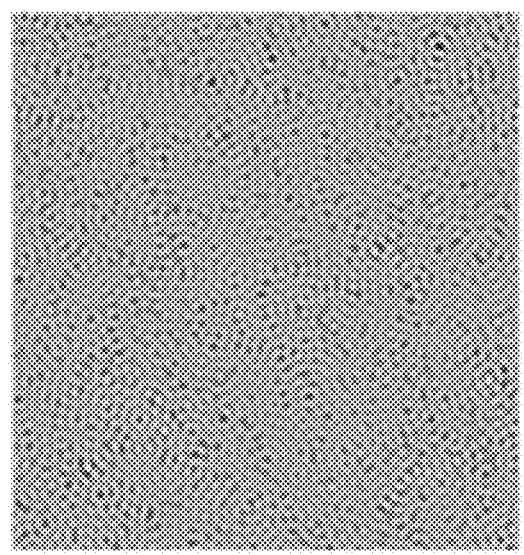
FIG. 19 is a bit map image illustrating an exemplary pattern image according to an example.

In Example C, the optical body 1 was produced under conditions similar to those in Example A except that the cycle perturbation was 0%, and the light distribution property was evaluated by a method similar to that of Example A. FIG. 19 illustrates a pattern image. In this pattern image, the height $z_2$ of the composite structure 20 is depicted in eight gray levels. As is apparent from FIG. 19, it is understood that convexities and concavities of the composite structure 20 are distributed randomly in the pattern image.

Figure 20:
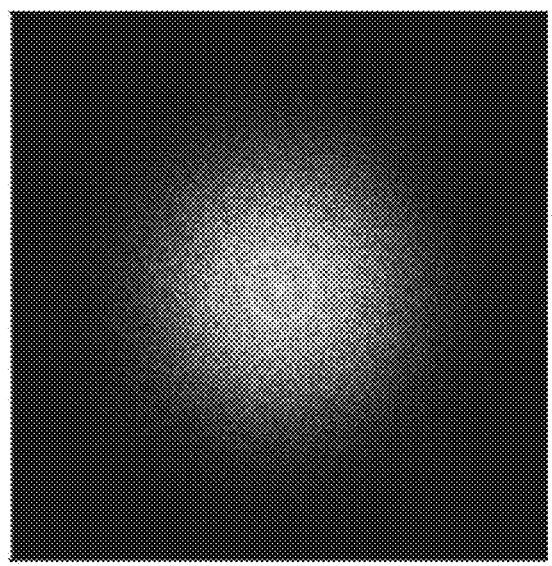
FIG. 20 is a simulation image illustrating a light distribution property of an optical body according to an example.
Figure 21:
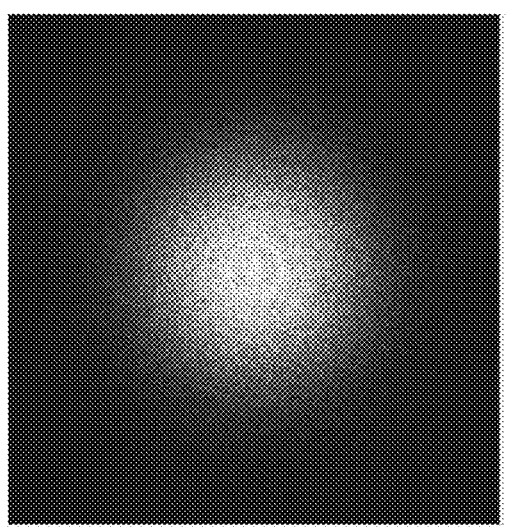
FIG. 21 is a simulation image illustrating a light distribution property of the optical body according to an example.

FIG. 20 and FIG. 21 illustrate results of simulations. FIG. 20 illustrates a projection image projected on a screen when light having a wavelength of 532 nm was incident upon the optical body 1, and FIG. 21 illustrates a projection image projected on a screen when synthetic light having wavelengths of 473 nm, 532 nm, and 635 nm was incident upon the optical body 1. It is understood that diffusion light has high homogeneity in both the examples.

1-4. Example D

Figure 22:
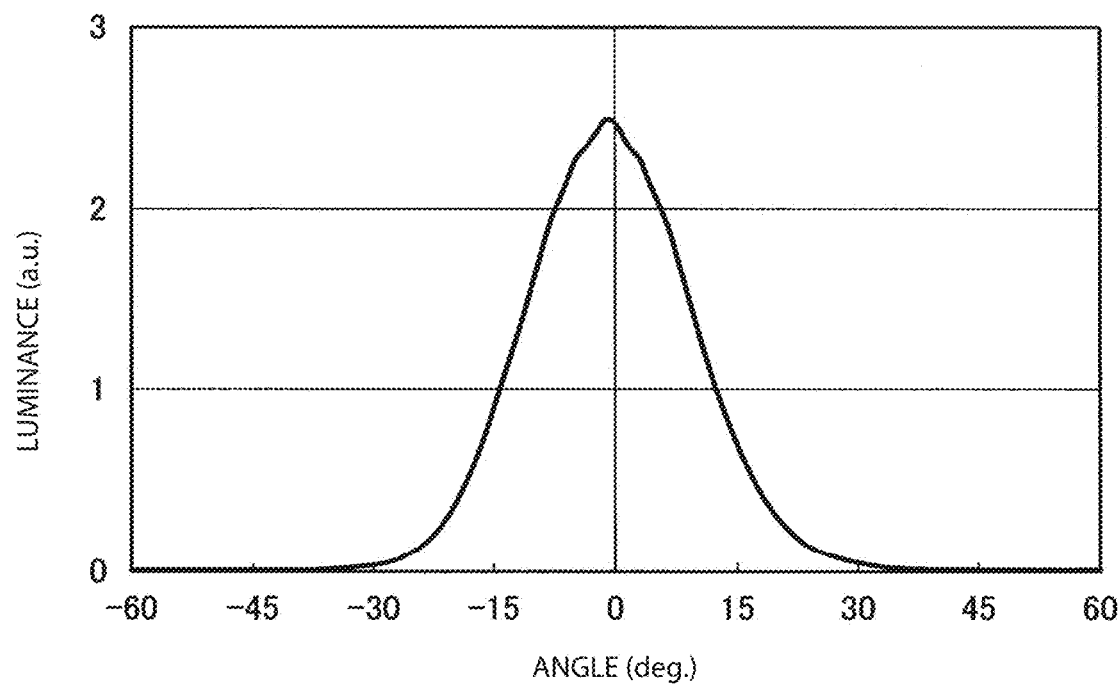
FIG. 22 is a graph illustrating an exemplary light distribution property of an optical body according to an example.
Figure 23:
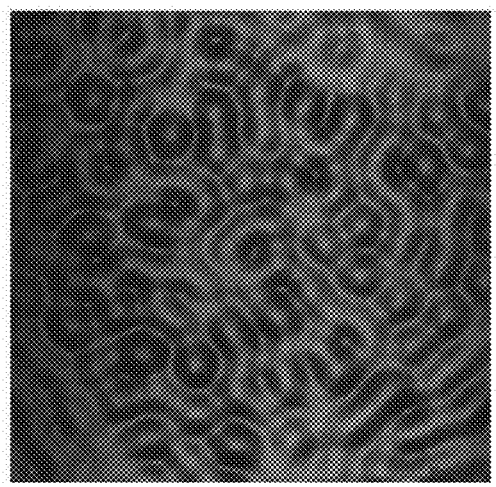
FIG. 23 is a confocal microscopic image illustrating a structure of a composite structure.
Figure 24:
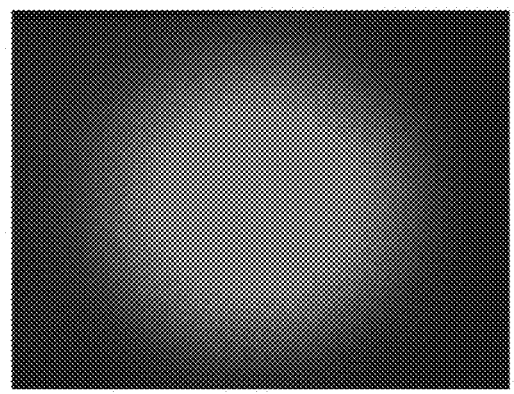
FIG. 24 is a laser projection image illustrating a light distribution property of the optical body according to an example.
Figure 25:
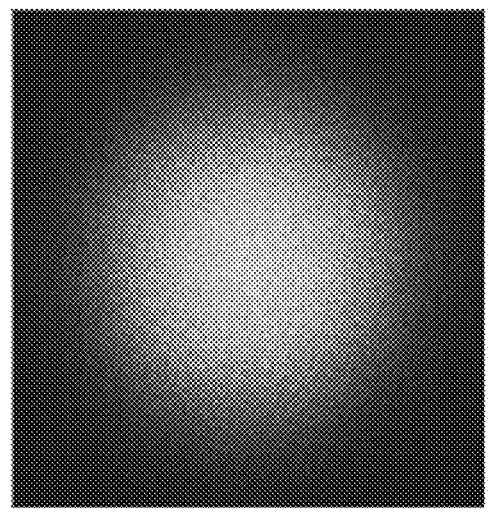
FIG. 25 is a simulation image illustrating the light distribution property of the optical body according to an example.

In Example D, the optical body 1 was produced under conditions similar to those in Example A except that the in-plane existence probability P was 0.6%, and the cycle Λ was 4 μm, and the light distribution property was evaluated by a method similar to that of Example A. FIG. 22 illustrates a light distribution property measured using Mini-Diff. In Example D, a distribution having a high homogeneous light distribution property is also obtained. FIG. 23 illustrates a confocal microscopic image of the composite structure 20 of the optical body 1. As is apparent from FIG. 23, it is understood that the composite structure 20 has been formed on the surface of the optical body 1. FIG. 24 illustrates a projection image obtained when irradiating a screen with diffusion light obtained under conditions similar to those illustrated in FIG. 22. The distance of the screen from the optical body 1 was set at 100 mm. FIG. 25 illustrates a result of a simulation. FIG. 25 illustrates a projection image projected on the screen when light having a wavelength of 532 nm was incident upon the optical body 1. As is apparent from FIG. 24 and FIG. 25, it is understood that diffusion light has high homogeneity.

1-5. Example E

Figure 26:
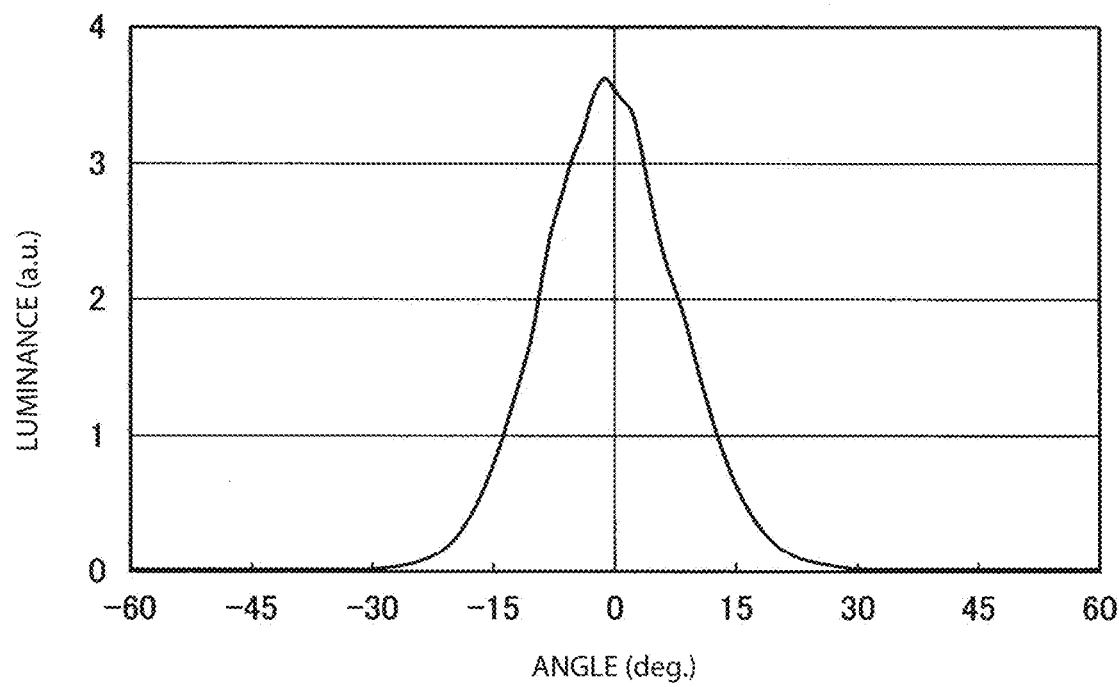
FIG. 26 is a graph illustrating an exemplary light distribution property of an optical body according to an example.
Figure 27:
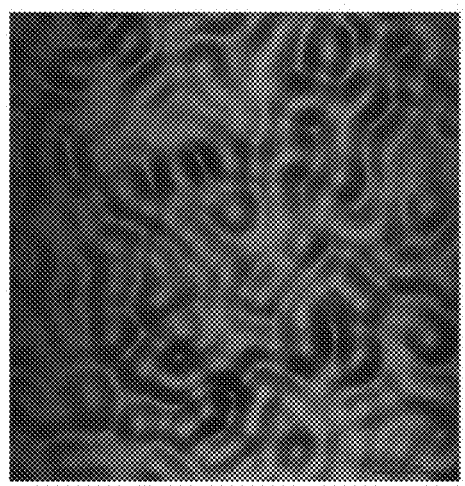
FIG. 27 is a confocal microscopic image illustrating a structure of a composite structure.
Figure 28:
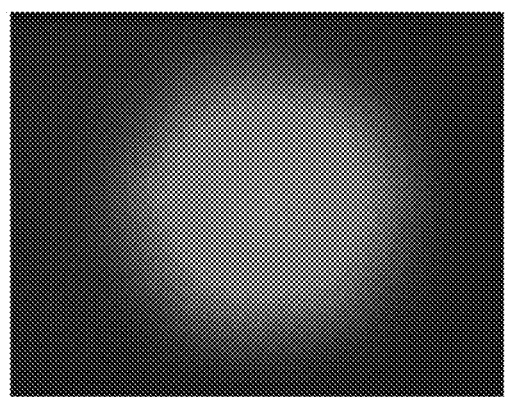
FIG. 28 is a laser projection image illustrating a light distribution property of the optical body according to an example.
Figure 29:
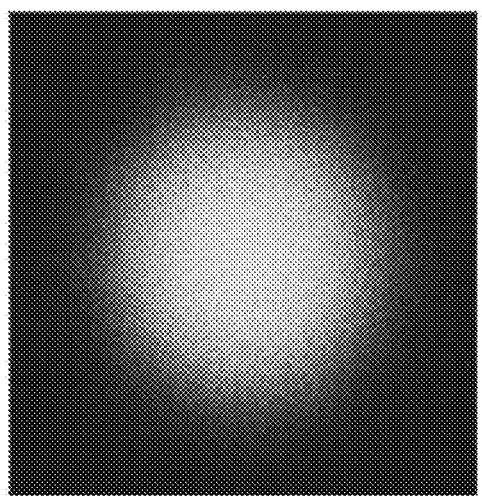
FIG. 29 is a simulation image illustrating a light distribution property of the optical body according to an example.

In Example E, the optical body 1 was produced under conditions similar to those in Example A except that the in-plane existence probability P was 0.5%, and the light distribution property was evaluated by a method similar to that of Example A. FIG. 26 illustrates a light distribution property measured using Mini-Diff. In Example E, a distribution having a high homogeneous light distribution property is also obtained. FIG. 27 illustrates a confocal microscopic image of the composite structure 20 of the optical body 1. As is apparent from FIG. 27, it is understood that the composite structure 20 has been formed on the surface of the optical body 1. FIG. 28 illustrates a projection image obtained when irradiating a screen with diffusion light obtained under conditions similar to those illustrated in FIG. 26. The distance of the screen from the optical body 1 was set at 100 mm. FIG. 29 illustrates a result of a simulation. FIG. 29 illustrates a projection image projected on the screen when light having a wavelength of 532 nm was incident upon the optical body 1. As is apparent from FIG. 28 and FIG. 29, it is understood that diffusion light has high homogeneity.

2. Examples 1 to 34, Comparative Examples 1 to 9

Figure 31:
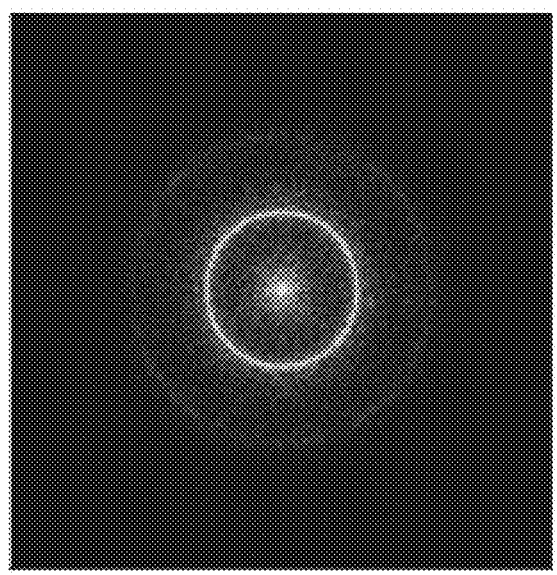
FIG. 31 is a simulation image illustrating a light distribution property of an optical body according to a comparative example.

In Examples 1 to 34 and Comparative examples 1 to 9, in order to inspect influences that the in-plane existence probability P, the cycle Λ, the existence region T. and the cycle perturbation δ exert upon the light distribution property, the light distribution properties of the optical body 1 with these parameters varied were evaluated through a simulation. A specific simulation method was similar to that of Example A. Parameters and results in the respective examples and comparative examples are shown in Tables 1 to 8. For the item Observation in Tables 1 to 8, "good light distribution" indicates a state in which ring light, a mottled pattern, or the like was not observed (diffusion light has high homogeneity). That is, it is shown that diffusion light similar to that of FIG. 12 and the like was observed. The term "extremely pale ring light" indicates that extremely pale ring light was observed, whilst the peak ratio value was less than or equal to 2.5. The term "ring light" indicates that ring light was observed clearly, and the peak ratio value was larger than 2.5. An example of ring light is illustrated in FIG. 31. For the item "Determination", peak ratio values less than or equal to 2.5 are determined as "Good", and peak ratio values larger than 2.5 are determined as "NG".

TABLE 1

|  | Comparative example 1 | Comparative example 2 | Example 1 | Example 2 | Example 3 | Example 4 | Example 5 | Example 6 |
|---|---|---|---|---|---|---|---|---|
| Existence probability P (%) | 0.1 | 0.1 | 0.1 | 0.1 | 0.1 | 0.1 | 0.1 | 0.1 |
| Cycle Λ (μm) | 3 | 4 | 5 | 6 | 7 | 8 | 9 | 10 |
| Existence region T (=αΛ) μm | 50 × 3 | 50 × 4 | 50 × 5 | 50 × 6 | 50 × 7 | 50 × 8 | 50 × 9 | 50 × 10 |

TABLE 1-continued

|  | Comparative example 1 | Comparative example 2 | Example 1 | Example 2 | Example 3 | Example 4 | Example 5 | Example 6 |
|---|---|---|---|---|---|---|---|---|
| Cycle perturbation δ (%) | 0 | 0 | 0 | 0 | 0 | 0 | 0 | 0 |
| δZ (μm) | 3.44 | 3.82 | 4.84 | 6.46 | 6.07 | 6.66 | 8.73 | 7.6 |
| Observation | ring light | ring light | extremely pale ring light | good light distribution | good light distribution | good light distribution | good light distribution | good light distribution |
| Peak ratio | 8 | 8 | 2 | 2 | 1.9 | 1.8 | 1.9 | 1.9 |
| Determination | NG | NG | Good | Good | Good | Good | Good | Good |

In Examples 1 to 6 and Comparative examples 1, 2, cycle dependence of the light distribution property was evaluated. As is apparent from Examples 1 to 6 and Comparative examples 1, 2, it is understood that if $\Lambda \geq 5$ μm holds (that is, if Condition 1 is satisfied), a good light distribution property is obtained.

TABLE 2

|  | Comparative example 3 | Comparative example 4 | Example 7 | Example 8 | Example 9 | Example 10 |
|---|---|---|---|---|---|---|
| Existence probability P (%) | 0.1 | 0.2 | 0.3 | 0.4 | 0.5 | 0.6 |
| Cycle Λ (μm) | 3 | 3 | 3 | 3 | 3 | 3 |
| Existence region T (=αΛ) μm | 50 × 3 | 50 × 3 | 50 × 3 | 50 × 3 | 50 × 3 | 50 × 3 |
| Cycle perturbation δ (%) | 0 | 0 | 0 | 0 | 0 | 0 |
| δZ (μm) | 3.44 | 4.15 | 5.03 | 5.15 | 6.35 | 6.45 |
| Observation | ring light | ring light | extremely pale ring light | good light distribution | good light distribution | good light distribution |
| Peak ratio | 8 | 4 | 2.3 | 2 | 2 | 2 |
| Determination | NG | NG | Good | Good | Good | Good |

TABLE 3

|  | Comparative example 5 | Example 11 | Example 12 | Example 13 | Example 14 | Example 15 |
|---|---|---|---|---|---|---|
| Existence probability P (%) | 0.1 | 0.2 | 0.3 | 0.4 | 0.5 | 0.6 |
| Cycle Λ (μm) | 4 | 4 | 4 | 4 | 4 | 4 |
| Existence region T (=αΛ) μm | 50 × 4 | 50 × 4 | 50 × 4 | 50 × 4 | 50 × 4 | 50 × 4 |
| Cycle perturbation δ (%) | 0 | 0 | 0 | 0 | 0 | 0 |
| δZ (μm) | 4.24 | 5.54 | 5.49 | 6.68 | 6.59 | 8.46 |
| Observation | ring light | extremely pale ring light | good light distribution | good light distribution | good light distribution | good light distribution |
| Peak ratio | 8 | 1.9 | 1.9 | 1.9 | 1.9 | 1.9 |
| Determination | NG | Good | Good | Good | Good | Good |

In Examples 7 to 15 and Comparative examples 3 to 5, the in-plane existence probability was varied with the cycle Λ of the main structural body 30 fixed at 3 or 4 μm, and optical properties were evaluated. As is apparent from Examples 7 to 15 and Comparative examples 3 to 5, it is understood that if P≥0.3% and Λ≥3 μm hold (that is, if Condition 2 is satisfied), a good light distribution property is obtained.

TABLE 4

|  | Comparative example 6 | Comparative example 7 | Comparative example 8 | Comparative example 9 | Comparative example 10 | Comparative example 11 |
| --- | --- | --- | --- | --- | --- | --- |
| Existence probability P (%) | 0.1 | 0.1 | 0.1 | 0.1 | 0.1 | 0.1 |
| Cycle Λ (μm) | 3 | 3 | 3 | 3 | 3 | 3 |
| Existence region T (=αΛ) μm | 20 × 3 | 30 × 3 | 50 × 3 | 50 × 3 | 50 × 3 | 50 × 3 |
| Cycle perturbation δ (%) | 0 | 0 | 0 | 10 | 30 | 50 |
| δZ (μm) | 3.22 | 3.22 | 3.39 | 3.27 | 3.62 | 3.26 |
| Observation | ring light | ring light | ring light | ring light | ring light | ring light |
| Peak ratio | 21 | 19 | 8 | 7 | 6 | 5 |
| Determination | NG | NG | NG | NG | NG | NG |

TABLE 5

|  | Comparative example 12 | Example 16 | Example 17 | Example 18 | Example 19 | Example 20 |
| --- | --- | --- | --- | --- | --- | --- |
| Existence probability P (%) | 0.2 | 0.2 | 0.2 | 0.2 | 0.2 | 0.2 |
| Cycle Λ (μm) | 4 | 4 | 4 | 4 | 4 | 4 |
| Existence region T (=αΛ) μm | 10 × 4 | 30 × 4 | 50 × 4 | 50 × 4 | 50 × 4 | 50 × 4 |
| Cycle δ (%) | 0 | 0 | 0 | 10 | 30 | 50 |
| δZ (μm) | 4.27 | 5.03 | 5.58 | 5.47 | 6.12 | 5.15 |
| Observation | ring light | extremely pale ring light | extremely pale ring light | good light distribution | good light distribution | good light distribution |
| Peak ratio | 3 | 2.3 | 2.1 | 2.2 | 2.1 | 2.1 |
| Determination | NG | Good | Good | Good | Good | Good |

TABLE 6

|  | Example 21 | Example 22 | Example 23 | Example 24 | Example 25 | Example 26 |
| --- | --- | --- | --- | --- | --- | --- |
| Existence probability P (%) | 0.5 | 0.5 | 0.5 | 0.5 | 0.5 | 0.5 |
| Cycle Λ (μm) | 5 | 5 | 5 | 5 | 5 | 5 |
| Existence region T (=αΛ) μm | 10 × 5 | 30 × 5 | 50 × 5 | 50 × 5 | 50 × 5 | 50 × 5 |
| Cycle δ (%) | 0 | 0 | 0 | 10 | 30 | 50 |
| δZ (μm) | 8.02 | 9.47 | 9.74 | 9.2 | 9.85 | 9.85 |
| Observation | good light distribution | good light distribution | good light distribution | good light distribution | good light distribution | good light distribution |
| Peak ratio | 2.2 | 2 | 2 | 1.9 | 2 | 1.9 |
| Determination | Good | Good | Good | Good | Good | Good |

TABLE 7

|  | Comparative example 13 | Comparative example 14 | Comparative example 15 | Comparative example 16 | Example 27 | Example 28 |
|---|---|---|---|---|---|---|
| Existence probability P (%) | 0.2 | 0.2 | 0.2 | 0.2 | 0.2 | 0.2 |
| Cycle $\Lambda$ (μm) | 3 | 3 | 3 | 3 | 3 | 3 |
| Existence region T (=α$\Lambda$) μm | 10 × 3 | 30 × 3 | 50 × 3 | 50 × 3 | 50 × 3 | 50 × 3 |
| Cycle $\delta$ (%) | 0 | 0 | 0 | 10 | 30 | 50 |
| $\delta Z$ (μm) | 3.35 | 3.52 | 4.14 | 4.05 | 5.05 | 4.07 |
| Observation | ring light | ring light | ring light | ring light | extremely pale ring light | extremely pale ring light |
| Peak ratio | 8 | 3.2 | 4 | 2.7 | 2.4 | 2.3 |
| Determination | NG | NG | NG | NG | Good | Good |

TABLE 8

|  | Example 29 | Example 30 | Example 31 | Example 32 | Example 33 | Example 34 |
|---|---|---|---|---|---|---|
| Existence probability P (%) | 0.3 | 0.3 | 0.3 | 0.3 | 0.3 | 0.3 |
| Cycle $\Lambda$ (μm) | 4 | 4 | 4 | 4 | 4 | 4 |
| Existence region T (=α$\Lambda$) μm | 10 × 4 | 30 × 4 | 50 × 4 | 50 × 4 | 50 × 4 | 50 × 4 |
| Cycle perturbation $\delta$ (%) | 0 | 0 | 0 | 10 | 30 | 50 |
| $\delta Z$ (μm) | 4.84 | 5.88 | 5.75 | 6.41 | 6.11 | 6.48 |
| Observation | good light distribution | good light distribution | good light distribution | good light distribution | good light distribution | good light distribution |
| Peak ratio | 2.1 | 2 | 2 | 1.9 | 2 | 1.9 |
| Determination | Good | Good | Good | Good | Good | Good |

In Examples 16 to 34 and Comparative examples 6 to 16, the existence region T and the cycle perturbation $\delta$ were varied with the in-plane existence probability P and the cycle $\Lambda$ of the main structural body 30 fixed at certain values, and optical properties were evaluated. As is apparent from Examples 16 to 34 and Comparative examples 6 to 16, it is understood that if P≥0.2%, $\Lambda$≥3 μm, T≥10$\Lambda$, and $\delta$≥30% (Condition 3-1) hold or if P≥0.2%, $\Lambda$≥4 μm, T>10$\Lambda$, and $\delta$≥0% (Condition 3-2) hold (that is, if Condition 3 is satisfied), a good light distribution property is obtained.

The preferred embodiment(s) of the present invention has/have been described above in detail with reference to the accompanying drawings, whilst the present invention is not limited to the above examples. A person skilled in the art may find various alterations and modifications within the scope of the appended claims, and it should be understood that they will naturally come under the technical scope of the present invention.

For example, in the above-described embodiment, the phase distribution of the main structural body 30 shall be expressed by a Sinc function, whilst the present invention is not limited to such an example. That is, the phase distribution of the main structural body 30 may be anything that is equivalent to an amplitude distribution obtained by subjecting a homogeneous pupil function to Fourier transform.

REFERENCE SIGNS LIST

1 optical body
10 base material
15 composite structure layer
20 composite structure
30 main structural body
31 central point
32 convexity
33 concavity

The invention claimed is:

1. An optical body in which a composite structure of main structural bodies is deployed continuously within a plane of a base material, wherein
    phase distributions of the main structural bodies within the plane of the base material are equivalent to amplitude distributions each obtained by subjecting a pupil function of a two-dimensional optical aperture to Fourier transform, and
    a peak ratio value is less than or equal to 2.5,
    wherein the peak ratio value is a ratio between a peak level and a base level of a light luminance profile, and
    wherein the main structural bodies each have an in-plane existence probability P, an existence region T, a cycle $\Lambda$, and a cycle perturbation $\delta$ that satisfy Conditions:

P≥0.2%, $\Lambda$≥3 μm, T≥10$\Lambda$, and $\delta$≥30%    (Condition 3-1); or

P≥0.2%, $\Lambda$≥4 μm, T>10$\Lambda$, and $\delta$≥0%    (Condition 3-2).

2. The optical body according to claim 1, wherein the two-dimensional optical aperture has a circular, rectangular, polygonal, or free shape.

3. The optical body according to claim 1, wherein the phase distributions are expressed by a Sinc function.

4. The optical body according to claim 1, wherein a phase distribution of the composite structure is obtained by simply summing the phase distributions of the main structural bodies.

5. The optical body according to claim 1, wherein the cycle $\Lambda$ that further satisfies Condition 1: $\Lambda \geq 5$ μm.

6. The optical body according to claim 1, wherein the in-plane existence probability P and the cycle $\Lambda$ that further satisfy Condition 2: $P \geq 0.3\%$ and $\Lambda \geq 3$ μm.

7. A lighting device in which the optical body as defined in claim 1 is arranged on a surface of a light source.

8. An image display device in which the optical body as defined in claim 1 is arranged between a light source and a display unit.

* * * * *